US012787084B2

(12) United States Patent
Fang et al.

(10) Patent No.: US 12,787,084 B2
(45) Date of Patent: Nov. 3, 2026

(54) MULTI-LINK COMMUNICATIONS OF A WIRELESS NETWORK WITH DYNAMIC LINK CONFIGURATION

(71) Applicant: ZTE Corporation, Shenzhen (CN)

(72) Inventors: Yonggang Fang, Shenzhen (CN); Bo Sun, Shenzhen (CN); Zhiqiang Han, Shenzhen (CN); Nan Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 535 days.

(21) Appl. No.: 17/815,769

(22) Filed: Jul. 28, 2022

(65) Prior Publication Data

US 2022/0369403 A1 Nov. 17, 2022

Related U.S. Application Data

(63) Continuation of application No. PCT/US2020/106077, filed on Jul. 31, 2020.

(30) Foreign Application Priority Data

Mar. 12, 2020 (WO) ................ PCT/CN2020/078991

(51) Int. Cl.
*H04W 76/15* (2018.01)
*H04W 74/0816* (2024.01)

(52) U.S. Cl.
CPC ....... *H04W 76/15* (2018.02); *H04W 74/0816* (2013.01)

(58) Field of Classification Search
CPC ............. H04W 76/15; H04W 74/0816; H04W 84/12
See application file for complete search history.

(56) References Cited

U.S. PATENT DOCUMENTS

2011/0090855 A1* 4/2011 Kim ..................... H04B 7/0452 370/329
2011/0235513 A1 9/2011 Ali
(Continued)

FOREIGN PATENT DOCUMENTS

AU 2017389025 A1 * 8/2019 ............. H04L 5/001
CN 104796977 7/2015
(Continued)

OTHER PUBLICATIONS

Co-Pending EP Application No. 20924271.8, Extended European Search Report dated May 23, 2023, 13 pages.
(Continued)

*Primary Examiner* — Chuong M Nguyen
(74) *Attorney, Agent, or Firm* — Ashurst Perkins Coie US LLP

(57) ABSTRACT

Methods, systems, and devices related to related to digital wireless communication, and more specifically, to techniques related to the multi-link operation with dynamic link configuration. In one exemplary aspect, a method for wireless communication includes transmitting a multi-link capability information from a network node indicating the network node is capable of operation on multi-link. In another exemplary aspect, the method includes receiving a multi-link capability indication message and using multi-link association request and response message exchanges to establish or update an association between a station and a network node for operation over one or more wireless links. The multi-link operation can be dynamically configured and reconfigured according to the radio channel condition changes and acquired transmission opportunity.

20 Claims, 25 Drawing Sheets

(56) References Cited

U.S. PATENT DOCUMENTS

| | | | | |
|---|---|---|---|---|
| 2012/0087358 | A1* | 4/2012 | Zhu | H04W 72/23 370/338 |
| 2012/0218947 | A1 | 8/2012 | Merlin et al. | |
| 2015/0098397 | A1 | 4/2015 | Damnjanovic et al. | |
| 2016/0164654 | A1* | 6/2016 | Huang | H04B 7/0452 370/392 |
| 2016/0212625 | A1 | 7/2016 | Damnjanovic et al. | |
| 2016/0316470 | A1 | 10/2016 | Wong et al. | |
| 2017/0006542 | A1* | 1/2017 | Huang | H04W 52/0209 |
| 2017/0055290 | A1 | 2/2017 | Lv et al. | |
| 2017/0257888 | A1 | 9/2017 | Kneckt et al. | |
| 2018/0176929 | A1 | 6/2018 | Ryu et al. | |
| 2018/0206284 | A1 | 7/2018 | Zhou et al. | |
| 2019/0082373 | A1* | 3/2019 | Patil | H04L 1/1614 |
| 2019/0082463 | A1 | 3/2019 | Patil et al. | |
| 2019/0182714 | A1 | 6/2019 | Chu et al. | |
| 2019/0364555 | A1 | 11/2019 | Huang et al. | |
| 2020/0029324 | A1 | 1/2020 | Nezou et al. | |
| 2020/0221545 | A1* | 7/2020 | Stacey | H04W 84/12 |
| 2020/0305193 | A1 | 9/2020 | Kim et al. | |
| 2021/0029766 | A1* | 1/2021 | Zhang | H04W 76/15 |
| 2021/0243749 | A1 | 8/2021 | Hoang et al. | |
| 2021/0345134 | A1 | 11/2021 | Ottersten et al. | |
| 2023/0007716 | A1* | 1/2023 | Inohiza | H04W 76/15 |

FOREIGN PATENT DOCUMENTS

| | | |
|---|---|---|
| CN | 105380360 | 8/2016 |
| CN | 107548569 | 1/2018 |
| CN | 104349405 | 1/2019 |
| CN | 109587052 | 4/2019 |
| CN | 112188640 | 1/2021 |
| JP | 09289684 | 4/1997 |
| WO | 107548569 | 1/2018 |
| WO | 2018/121347 | 7/2018 |
| WO | 2018/136513 | 7/2018 |
| WO | 2018/136516 | 7/2018 |
| WO | 2019/099268 | 5/2019 |
| WO | 2019/132607 | 7/2019 |
| WO | 2020/033381 | 2/2020 |
| WO | 2020/33381 | 2/2020 |
| WO | 2021/003700 | 1/2021 |
| WO | 2021/004079 | 1/2021 |
| WO | 2021/004142 | 1/2021 |
| WO | 2021/182902 | 9/2021 |

OTHER PUBLICATIONS

Qualcomm, "MLO: Sync PPDUs", IEEE Draft; 11-20-0026-00-00BE-MLO-SYNC-PPDUS, IEEE-SA Mentor, Piscataway, NJ USA vol. 802.11 EHT; 802.11be, Jan. 13, 2020 10 pages.

Samsung "Multi-link Channel Access Follow-up", vol. 802.11 EHT; 802.11be, No. 4, EEE-SA Mentor, Piscataway, NJ USA, Jan. 21, 2020 21 pages.

Broadcom, Inc. "MLO-Synch-Transmission", IEEE Draft; IEEE-SA Mentor, Piscataway, NJ USA, vol. 802.11 EHT; 802.11be, No. 1, Jan. 21, 2020, 59 pages.

Huawei et al., "Coexistence and channel access for NR-based unlicensed band operation," 3GPP TSG RAN WG1 NR Ad Hoc Meeting, Qingdao, China, R1-1711467, 5 pages, Jun. 27-30, 2017.

International Search Report and Written Opinion for International Application No. PCT/CN2020/078991, mailed on May 27, 2020 (7 pages).

USPTO, Notice of Allowance for U.S. Appl. No. 17/647,567, mailed on Jul. 24, 2024, 7 pages.

Co-Pending CN Application No. 202080098359.0, First Office Action dated Jun. 19, 2024, 47pages with unofficial English translation.

Qualcomm, Inc. "MLA: Support for Constrained Devices" IEEE Jan. 2020 802.11-20/0026r0, Jan. 10, 2020, 72 pages.

Co-Pending U.S. Appl. No. 17/647,567, Non-Final Office Action dated Mar. 20, 2024, 14 pages.

Co-Pending CN Application No. 202080050271.1 Office Action, dated Sep. 23, 2024 20 pages with machine English translation.

Intel Corp, "Low latency service in 802.11be" IEEE 802.11-20/0418r0, Mar. 2020, 13 pages.

Co-Pending EP Application No. 19936862.2 Extended Search Report, dated Jun. 21, 2022 9 pages.

Intel Corp "Low latency service in 802. 11be" vol. 802.11 EHT; 802.11be, Mar. 10, 2020, 13 pages.

Fang et al. "Channel Access Category" 11-20-0468-00-00BE-CHANNEL-ACCESS-CATEGORY, IEEE-SA Mentor, Piscataway, NJ USA, vol. 802.11 EHT; 802.11be, Mar. 16, 2020, 12 pages.

Subir Das (PL): "Priority Access Support for NS/EP Services", IEEE Draft; 11-20-0021-01-00-BE-Priority-Access-Support -For-NS-EP-Services, IEEE-SA Mentor, Piscataway, NJ USA, vol. 802.11 EHT; 802.11be, No. 1, Jan. 14, 2020, 15 pages.

Co-Pending EP Application No. 2083734.6 Extended Search Report, dated Sep. 26, 2022 10 pages.

Co-Pending U.S. Appl. No. 17/647,569, Non-Final Office Action dated May 7, 2024, 25 pages.

Co-Pending CN Application No. 202080050327.3 Office Action, dated Mar. 14, 2025 26 pages with unofficial English summary.

Co-Pending EP Application No. 20 836 839.9, Intention to Grant, dated Mar. 17, 2025, 8 pages.

Co-Pending EP Application No. 20 837 346.4, Intention to Grant, dated Mar. 25, 2025, 9 pages.

Co-Pending EP Application No. 25155607.2, Extended European Search Report, dated Jun. 24, 2025, 9 pages.

"Telecommunications and exchange between information technology systems—Requirements for local and metropolitan area networks—Part 11: Wireless LAN medium access control (MAC) and physical layer (PHY) specifications" ISO/IEC/IEEE 8802-11:2018, May 9, 2018, 3538 pages.

* cited by examiner

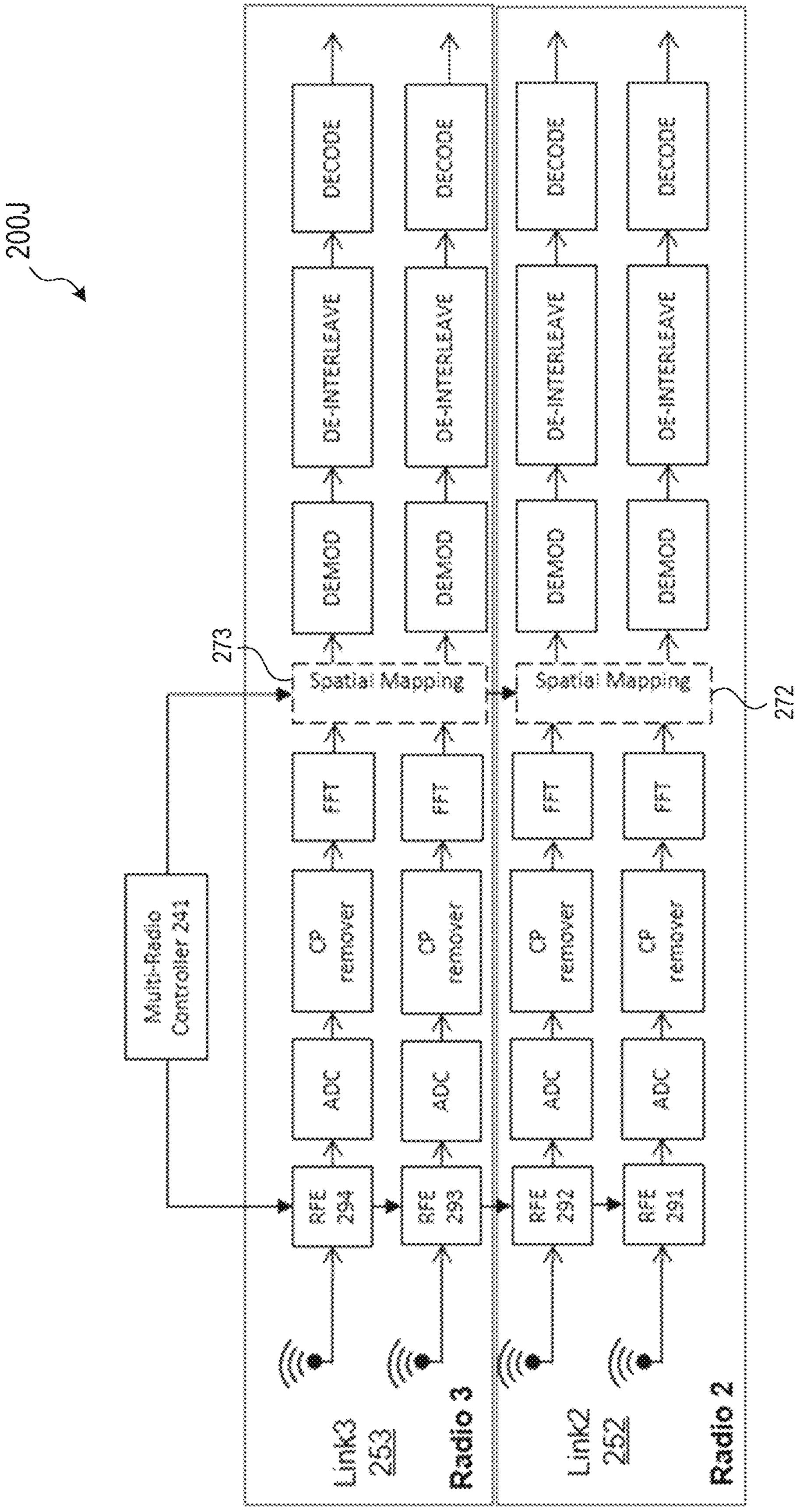
FIG. 2.J

600

| | TX | | RX | |
|---|---|---|---|---|
| MAC-U 610 | A-MSDU Aggregation | | A-MSDU De-aggregation | |
| | PS Defer Queue | | (null) | |
| | Sequence Number Assignment | | (null) | |
| | MSDU Integrity Protection (optional) | | MSDU Integrity Protection (optional) | |
| | Fragmentation | | Defragmentation | |
| | Packet Number Assignment | | Replay Detection (optional) | |
| | (null) | | Block Ack Buffering and Reordering | |
| | MPDU Encryption and Integrity Protection | | MPDU Decryption and Integrity Check | |
| MAC-L 620 | **TX1** | **TX2** | **RX1** | **RX2** |
| | (null) | (null) | Duplicate Removal | Duplicate Removal |
| | (null) | (null) | HARQ-ACK/NACK, BACK, ACK | HARQ-ACK/NACK, BACK, ACK |
| | (null) | (null) | Address Filtering | Address Filtering |
| | MPDU Header + CRC Creation | MPDU Header + CRC Creation | MPDU Header + CRC Validation | MPDU Header + CRC Validation |
| | MPDU Aggregation | MPDU Aggregation | MPDU De-aggregation | MPDU De-aggregation |

FIG. 6

MULTI-LINK COMMUNICATIONS OF A WIRELESS NETWORK WITH DYNAMIC LINK CONFIGURATION

CROSS-REFERENCE TO RELATED APPLICATION

This patent document is a continuation of PCT/CN2020/106077, filed on Jul. 31, 2020, which claims the benefit of priority under 35 U.S.C. § 119(a) and the Paris Convention of International Patent Application No. PCT/CN2020/078991, filed on Mar. 12, 2020. The entire contents of the before-mentioned patent applications are incorporated by reference as part of the disclosure of this application.

TECHNICAL FIELD

This patent document is directed generally to wireless communications.

BACKGROUND

Wireless communication systems can include a network of one or more access points (APs) that communicate with one or more wireless stations (STAs). An AP may emit radio signals that carry management information, control information or user data to one or more STAs. A STA may transmit radio signals to an AP in the same frequency channel using a technique such as time division duplexing (TDD) or in a different frequency using a technique such as frequency division duplexing (FDD).

Institute of Electrical and Electronics Engineers (IEEE) 802.11 specifies a specification for a wireless local area network (WLAN) over radio channels in license-exempt bands. The basic unit of a WLAN is a basic service set (BSS). An infrastructure BSS may include the BSS with stations through associating with an Access Point (AP) to connect to the wired network or Internet. In an infrastructure BSS, both an access point and a station may share the same frequency channel via using Carrier Sensing Multiple Access with Collision Avoidance (CSMA/CA) technology, a kind of TDD mechanism, for multiple access and data transmission.

SUMMARY

This document discloses methods, systems, and devices related to digital wireless communications, and more specifically, to techniques related to utilizing multiple wireless connection links between a wireless station and an access point to transmit user data to reduce the access delay, improve transmission reliability, and increase transmission throughput.

In one exemplary aspect, a method for wireless communication includes receiving an indication message from a network node, the indication message indicating that the network node is capable of transmitting information over one or more wireless links. The method also includes transmitting a first request message to the network node, wherein the network node associates the station to the one or more wireless links based on receiving the first request message.

In another exemplary embodiment, a method for wireless communication includes transmitting an indication message to a station, the indication message indicating that the network node is capable of transmitting information over at least one wireless link. The method also includes receiving a first request message including multi-link capability information to the network node. The method also includes associating one or more wireless links with the station based on the multi-link capability information.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

FIG. 2J illustrates a tenth example of ML station and access point system architecture.

FIG. 6 illustrates an example protocol architecture for support of multi-link operation.

DETAILED DESCRIPTION

Figure 1A:
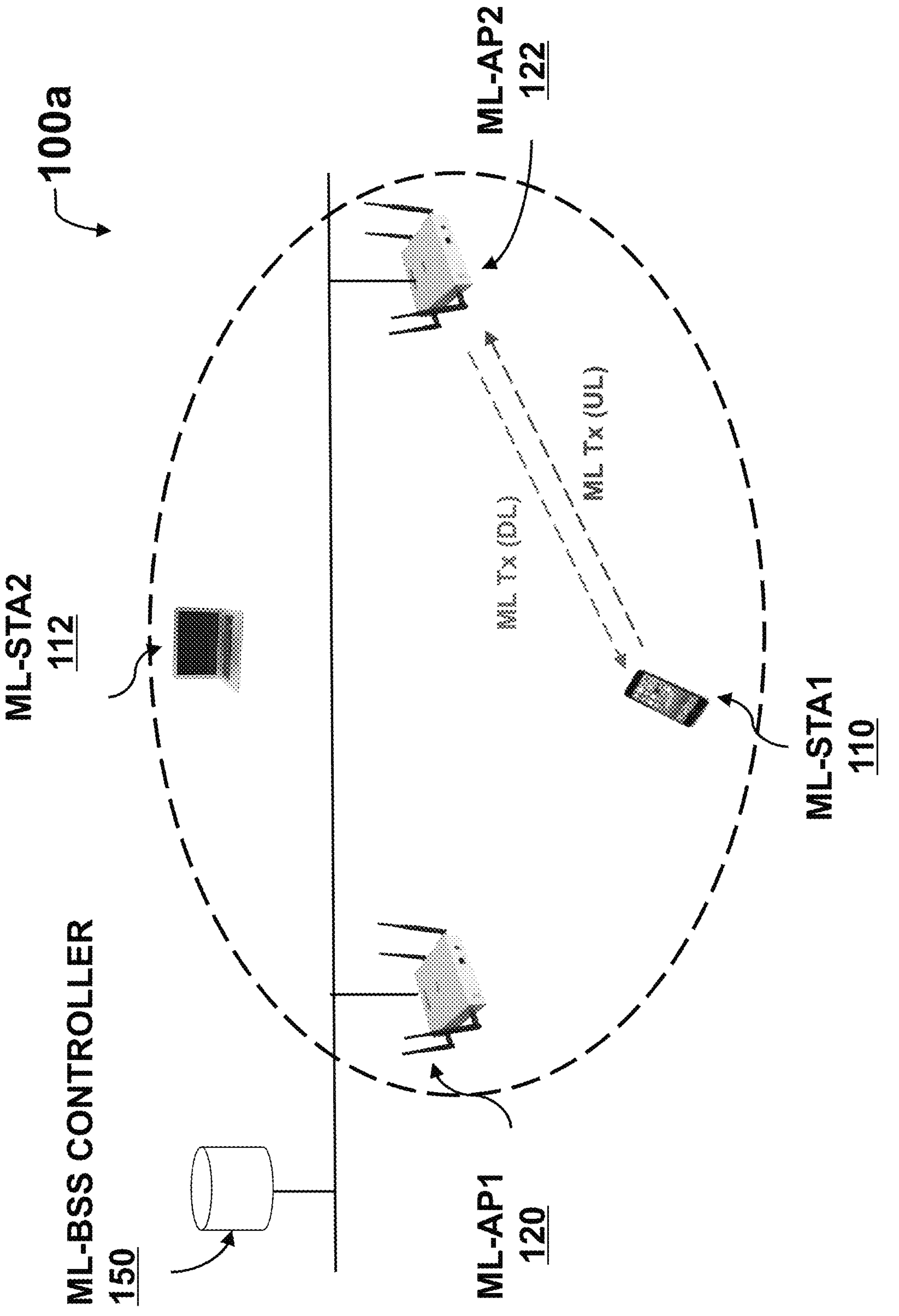
FIG. 1A illustrates an example infrastructure BSS.

Wireless local area communication is fast becoming a popular mechanism to communicate with each other directly or via a network such as the internet. Multiple wireless devices (e.g., smartphones, tablets, etc.) may attempt to transmit and receive data on a shared communication spectrum in an environment (e.g., airport, homes, buildings, sports venues, etc.). Additionally, wireless devices (e.g., sensors, cameras, control units, etc.) are increasingly utilized in networks for various applications (e.g., factory automations, vehicle communications etc.).

In some cases, transmission of data is based on an air interface as specified by the Institute of Electrical and Electronics Engineers (IEEE), standard 802.11 series. In this specification, devices may share a transmission medium that include a certain set of rules. In IEEE 802.11, the basic service set (BSS) is a building block of a Wireless Local Area Network (WLAN). Wireless stations (also called stations) associated in the radio coverage area may establish a BSS and provide the basic service of a WLAN.

IEEE 802.11 specifies wireless access protocols for operation on a license exempt and/or shared spectrum. A wireless station can operate on a channel in license exempt frequency band (e.g., 2.4 GHz or 5 GHz), or shared frequency band with other services (e.g., 6 GHz).

When operating on a license exempt or shared spectrum, transmission and reception of wireless messages may be unreliable due to interference from other stations located within the same coverage area, such as hidden node transmissions or "visible" nodes attempting to utilize the same shared communication medium for transmissions.

The device operated on the unlicensed frequency band utilizes on the carrier sensing multiple access with collision avoidance (CSMA/CA) mechanism to control the multiple medium access based on IEEE802.11 specification. Each station may implement a CSMA/CA function. Before access to the wireless medium, the station senses the medium occupancy using CSMA/CA. If the station determines that the medium is busy, it waits and retries sensing the medium at a later time. If the station senses the medium in idle, the station may wait for some inter frame space (IFS) and then enter the contention window (CW). In order to support multiple stations to access to the medium, each station may backoff a random time before transmitting over the medium to reduce the collision and distribute the medium access evenly. The backoff time may be defined as $$\text{backoff Time}=\text{Random( )}\times a\text{SlotTime} \quad \text{Eq. (1)}$$

Where Random ( )=Pseudo random integer uniformly distributed over the interval [0, CW], and CW is an integer:

$$a\text{CWmin}\leq \text{CW}\leq a\text{CWmax} \quad \text{Eq. (2)}$$

The existing CSMA/CA mechanism specified in IEEE 802.11 may include a significant access delay in each transmission and medium utilization efficiency. When a large number of stations share the same medium and are going to transmit simultaneously, the CSMA/CA mechanism may cause the unreliable transmissions (e.g., more transmission packet loss, longer access delay, and larger jittering in an unstable radio environment). Such unreliable transmissions may create a decreased user experience and limit the performance of applications that require low latency and high reliability over an IEEE802.11 access network.

In some cases, as the IEEE802.11 specification allows for one station to associate with one access point over one wireless link, it may be difficult for the station to receive a reliable transmission when this wireless link is congested or interfered, ether at the station side or the access point side. In addition, a wireless station and access point may not be able to communicate each other if the associated wireless link is busy.

This patent document describes techniques to reduce the access latency, improve transmission reliability, and increase transmission throughput in WLAN networks by implementing a mechanism to utilize and control the multi-link (ML) communications over one or multiple wireless channels.

A communication link (or radio link, or link) can comprise a logic connection between two communication entities (e.g. wireless stations). The signal transmitted on a link can be generated by a radio of wireless station. The signals transmitted on multi-links can be carried on one frequency channel or multiple different frequency channels.

FIG. 1A illustrates an example infrastructure BSS 100*a*. The infrastructure may include multiple ML stations, e.g. ML-STA1 110 and ML-STA2 112. Each station may be in the coverage of a first ML access point ML-AP1 120 and/or a second ML access point ML-AP2 122, which form the infrastructure ML-BSS: ML-BSS1 and ML-BSS2. ML access points ML-AP1 120 and ML-AP2 122 may be interconnected via a switch through a distribution system (DS) to form a ML-BSS 100 coordinated via a ML-BSS controller 150.

In some embodiments, a ML station (e.g., ML-STA1 110) with multiple radios can operate one or multiple channels (or OFDMA channels) in the same frequency band or a different channel to establish multi-links (ML) for communication with a ML AP (e.g., ML-AP1 122). A ML station can associate with one or more ML access points in the ML-BSS coverage to establish ML connections.

Figure 1B:
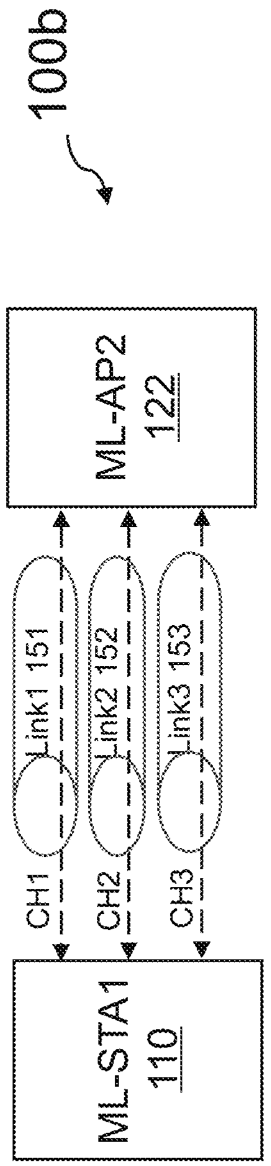
FIG. 1B illustrates a first example of multiple links being carried on one or more radio frequency channels.
Figure 1C:
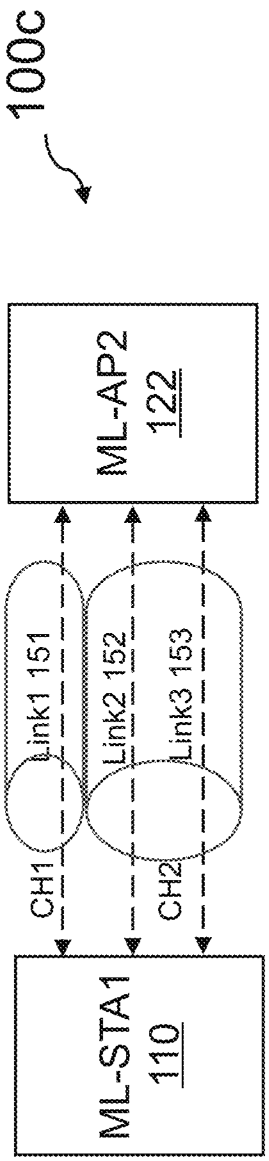
FIG. 1C illustrates a second example of multiple links being carried on one or more radio frequency channels.
Figure 1D:
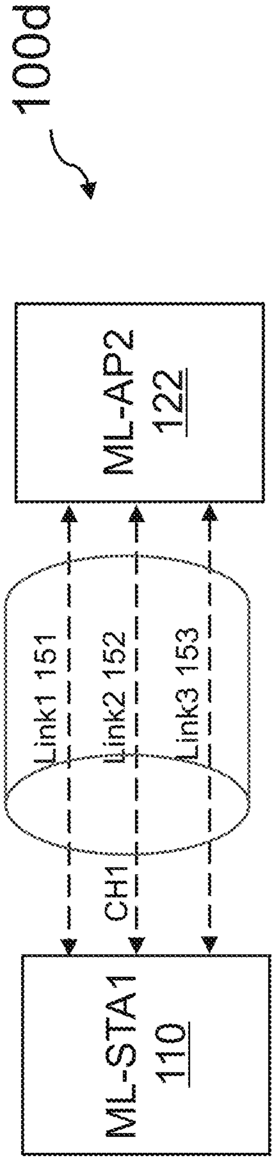
FIG. 1D illustrates a third example of multiple links being carried on one or more radio frequency channels.

FIG. 1B-D illustrate example multi-links 100*b*, 100*c*, 100*d* being carried on one or more radio frequency channels. For example, FIG. 1B shows an example of ML-STA1 110 connecting to ML-AP2 122 over three multi-links, i.e. Link1 151, Link2 152, and Link3 153. The multi-links can be set over different radio frequency channels, CH1, CH2 and CH3 respectively. FIG. 1C shows another example ML-STA1 110 connecting to ML-AP2 122 over three multi-links, i.e. Link1 151, Link2 152, and Link3 153. The Link1 151 can be set over the radio frequency channel CH1, while the Link2 152 and Link3 153 are set over radio frequency channel CH2. FIG. 1D shows another example ML-STA1 110 connecting to ML-AP2 122 over three multi-links, i.e. Link1 151, Link2 152, and Link3 153. In FIG. 1D, all three links can be set over a radio frequency channel CH1 only.

In some embodiments, the ML-AP and ML-STA can leverage the joint or selective transmission modes over one or multi-links (e.g. radio frequency channels) to reduce the access latency, improve the transmission reliability and/or increase the transmission throughput via the control of a ML-STA (e.g., ML-STA1 110), a ML-AP (e.g. ML-AP2) and/or coordinated by the ML-MBSS Controller 150. A ML communication may include bi-directional transmission between a ML-STA and a ML-AP via part or all of the ML-links between them. It may have some different modes.

A joint ML downlink transmission mode refer to the operation that one or more ML-APs transmit the same PPDU to the ML-STA over MLs at the same time. The ML-STA may combine the received signals in the baseband to improve the signal-to-noise-ratio (SINR) of received signals for increasing the reliability of transmissions or select the best signal from the multiple received signals in the MAC layer. A joint ML uplink transmission mode may refer to that a ML-STA transmits the same PPDU to a ML-AP over MLs at the same time. The ML-AP may combine the received signals in the baseband to improve the signal-to-noise-ratio (SINR) of received signals or select the best signal from the multiple received signals in the MAC layer for increasing the reliability of transmissions.

A selective ML downlink transmission mode may refer to the operation that ML-AP1 120, or ML-AP2 122 or both transmit a downlink PPDU to a ML-STA 110 over one of ML. The ML-STA 110 may selectively receive the transmission from either ML-AP1 120 or ML-AP2 122 over the MLs. The selective ML uplink transmission mode may refer to that a ML-STA 110 transmits an uplink PPDU to one or more ML-AP over one of ML connections. The ML-AP 122 may receive the transmission from the ML-STA 110 over the MLs, optionally coordinated by the ML-BSS controller 150. The selective ML transmission may be used by the wireless station or access point to reduce the access latency via selecting the first available link among ML connections for the transmission.

A simplex ML transmission mode may refer to the operation that different ML PPDUs can be concurrently transmitted by the ML-AP 122 (or ML-STA 110), or can be concurrently received by the ML-STA 110 (or ML-AP 122). But it can allow to concurrently transmit a ML PPDU by the ML-STA 110 (or ML-AP 122) and receive another ML PPDU by the same ML-STA 110 (or ML-AP 122).

A duplex ML transmission mode may refer to the operation that a ML PPDU can be transmitted over a ML channel by the ML-STA 110 (or ML-AP 122) and a different ML PPDU is received over another channel by the same ML-STA 110 (or ML-AP 122) concurrently. The duplex transmission operation provides the most flexible way of communication between ML-STA and ML-AP.

Figure 2A:
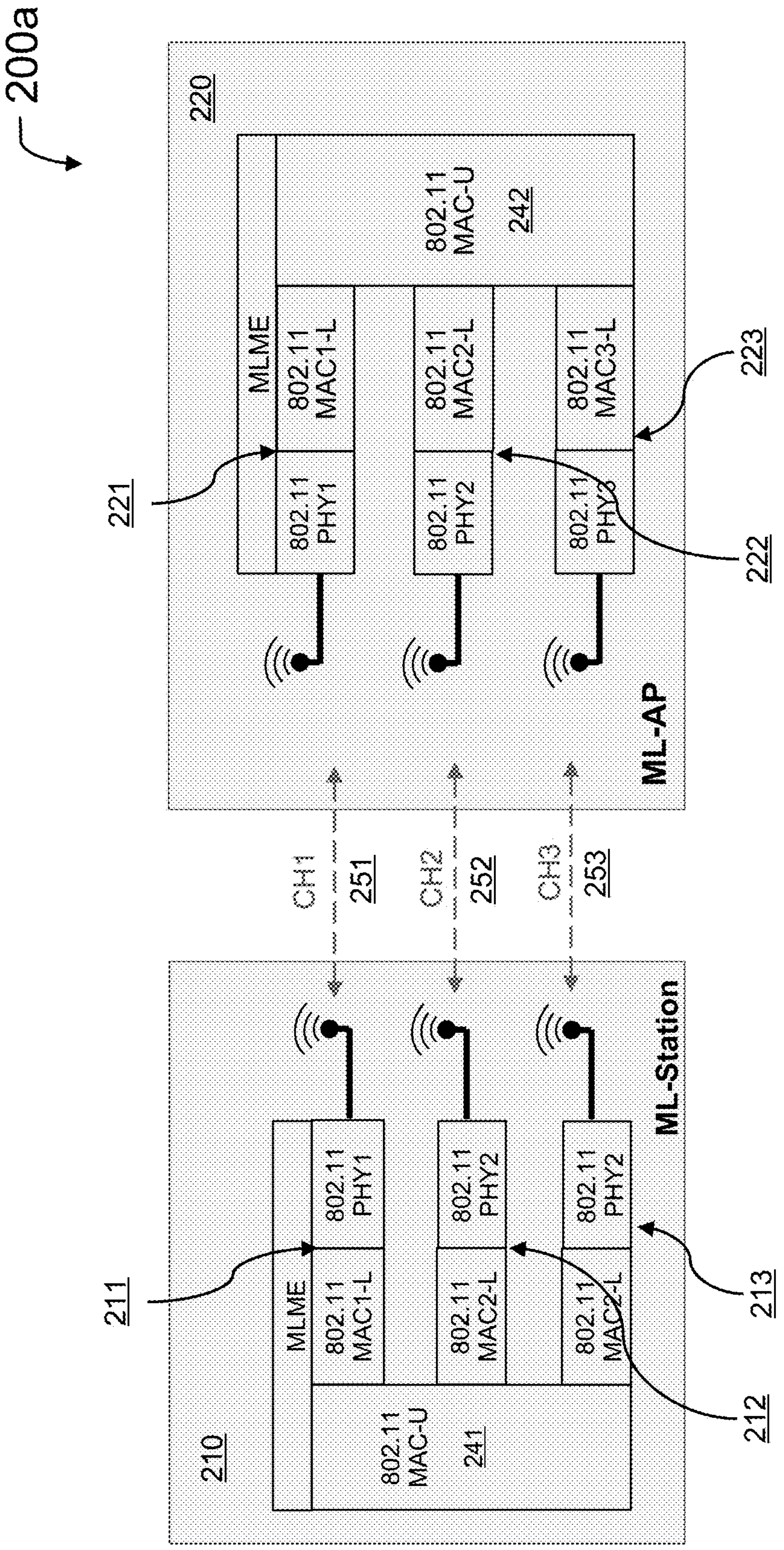
FIG. 2A illustrates a first example of ML station and access point system architecture.

FIGS. 2A-I illustrate examples of ML station and access point system architecture. In the first embodiment as shown in FIG. 2A, the ML system 200*a* consists of a ML-STA 210 and a ML-AP 220.

As shown in FIG. 2A, the ML-STA 210 can include ML radios 211, 212 and 213. Each ML radio may include a RF chain, an 802.11 PHY and a partial MAC (i.e., a lower MAC (MAC-L)). The ML radio 211 may operate on a wireless channel (e.g., CH1) to establish a radio link 251 to a ML-AP 220. Similarly, the ML radio 212 and 213 may operate on wireless channels (e.g. CH2 and CH3) respectively to establish radio links 252, 253 to the ML-AP 220. The ML-STA 210 may include ML radio controller 241 which may consist of a common 802.11 MAC (i.e., upper MAC (MAC-U)) with the Multi-Radio control function, which may manage the ML operation of the ML-STA 210.

The ML-AP 220 may include ML radios 221, 222 and 223. Each ML radio may include a radio frequency (RF) chain, an 802.11 PHY and a partial MAC (i.e., MAC-L). The ML radio 221 may operate on a wireless channel (e.g., CH1) to establish a radio link 251 to the ML station 210. Similarly, the ML radio 222 and 223 may operate on wireless channels (e.g., CH2 and CH3) respectively to establish radio links 252, 253 to the ML-STA 210. The ML-AP 220 may utilize a ML radio controller 241 which may consist of the common 802.11 MAC (MAC-U) with the Multi-Radio control function to manage the ML operation of the ML-AP 220.

Figure 2B:
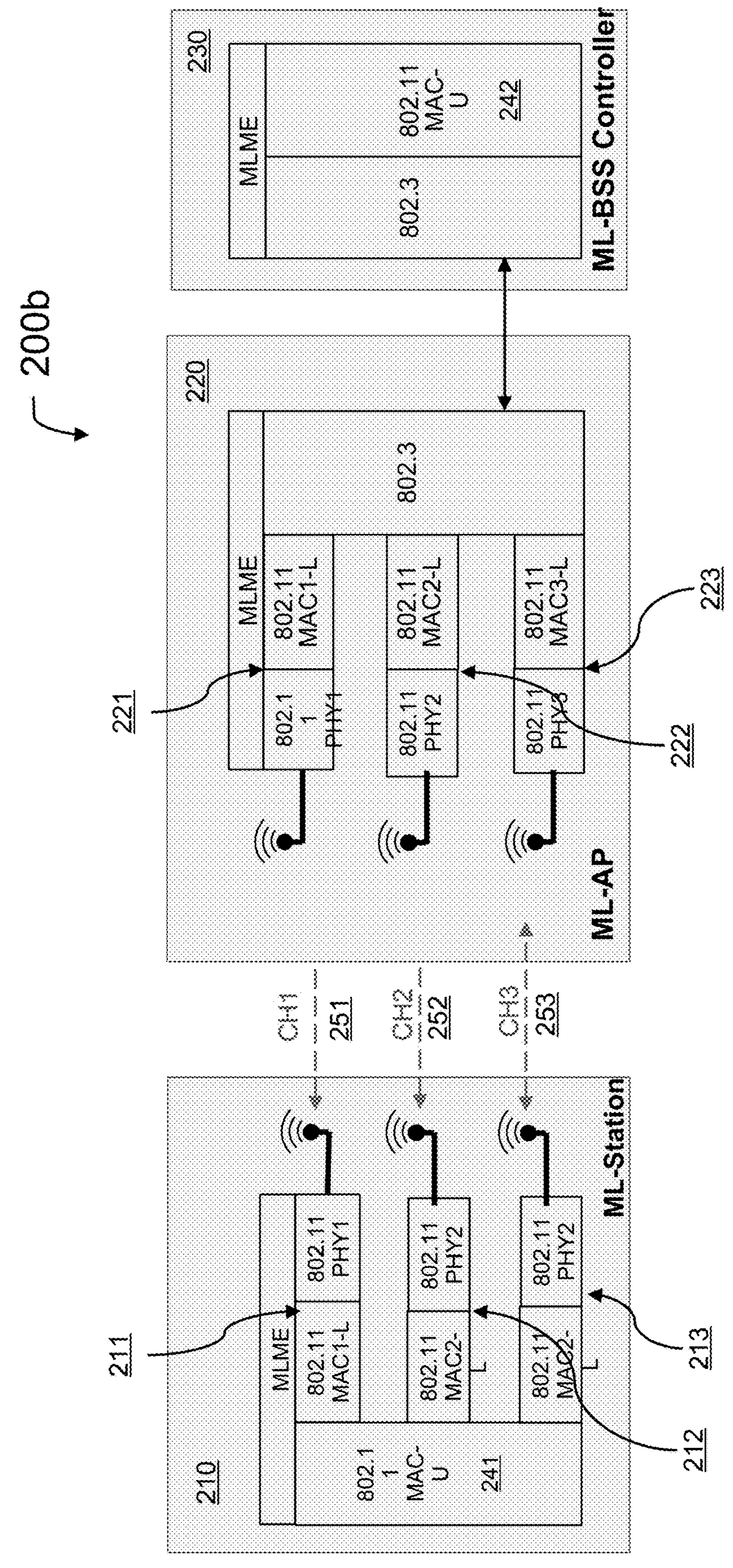
FIG. 2B illustrates a second example of ML station and access point system architecture.

In the second embodiment as shown in FIG. 2B, the ML system 200B may include a ML-STA 210, a ML-AP 220 and a ML-BSS controller 230.

As shown in FIG. 2B, the ML-STA 210 includes ML radios 211, 212 and 213. Each ML radio may include a RF chain, an 802.11 PHY and a partial MAC (i.e., MAC-L). The ML radio 211 may operate on a wireless channel (e.g., CH1) to establish a radio link 231 to a ML-AP 220. Similarly, the ML radio 212 and 213 may operate on wireless channels (e.g. CH2 and CH3) respectively to establish radio links 252, 253 to the ML-AP 220. The ML-STA 210 may use a ML radio controller 241 which may consist of the common 802.11 MAC (MAC-U) with the Multi-Radio control function to manage the ML operation of the ML-STA 210.

The ML-AP 220 may include ML radios 221, 222 and 223. Each ML radio may include a RF chain, an 802.11 PHY and a partial MAC, i.e. MAC-L. The ML radio 221 may operate on a wireless channel (e.g., CH1) to establish a radio link 251 to the ML-STA 210. Similarly, the ML radio 222 and 223 may operate on wireless channels (e.g., CH2 and CH3) respectively to establish radio links 252, 253 to the ML-STA 210.

The ML-BSS controller 230, which can be integrated with the ML-AP 220 or located separately as an individual network node, may coordinate one or more ML radio controller 242 for the ML operation of the ML-AP 220.

The Multi-Radio 211, 212 and 213 associated with ML 251, 252 and 253 may include wireless protocol links that can operate on same or different radio channels in the same frequency band or different frequency bands, like 2.4 GHz, 5 GHz or 6 GHz band. They could have the same channel bandwidth, like 20 MHz, 40 MHz, 80 MHz, or 160 MHz. They may allow different channel bandwidth combinations, such as 160 MHz+160 MHz+20 MHz, or 160 MHz+80 MHz+20 MHz, etc.

Figure 2C:
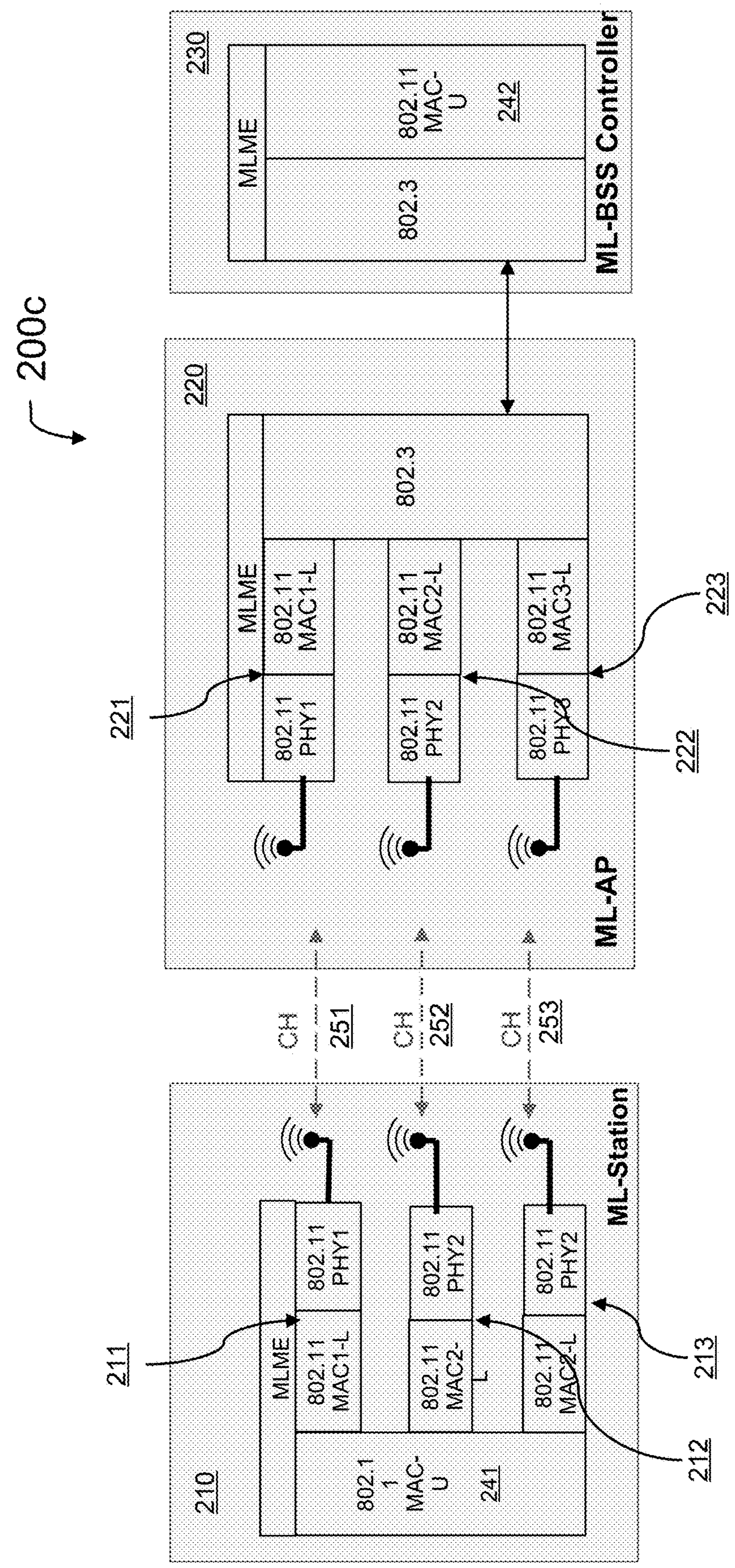
FIG. 2C illustrates a third example of ML station and access point system architecture.

In the third embodiment as shown in FIG. 2C, the ML system 200C may include a ML-STA 210, a ML-AP 220 and a ML-BSS controller 230. The Multi-Radio 211, 212 and 213 associated with ML 251, 252 and 253 may include wireless protocol links that can be configured to operate on the same radio channel (e.g., CH1) to provide multi spatial streams' communications between ML-STA 210 and ML-AP 220 when only one radio frequency channel is acquired for TXOP. Therefore, the ML-STA 210 and ML-AP 220 can leverage its ML capability to optimize the channel usage efficiency to improve the data throughput.

Figure 2D:
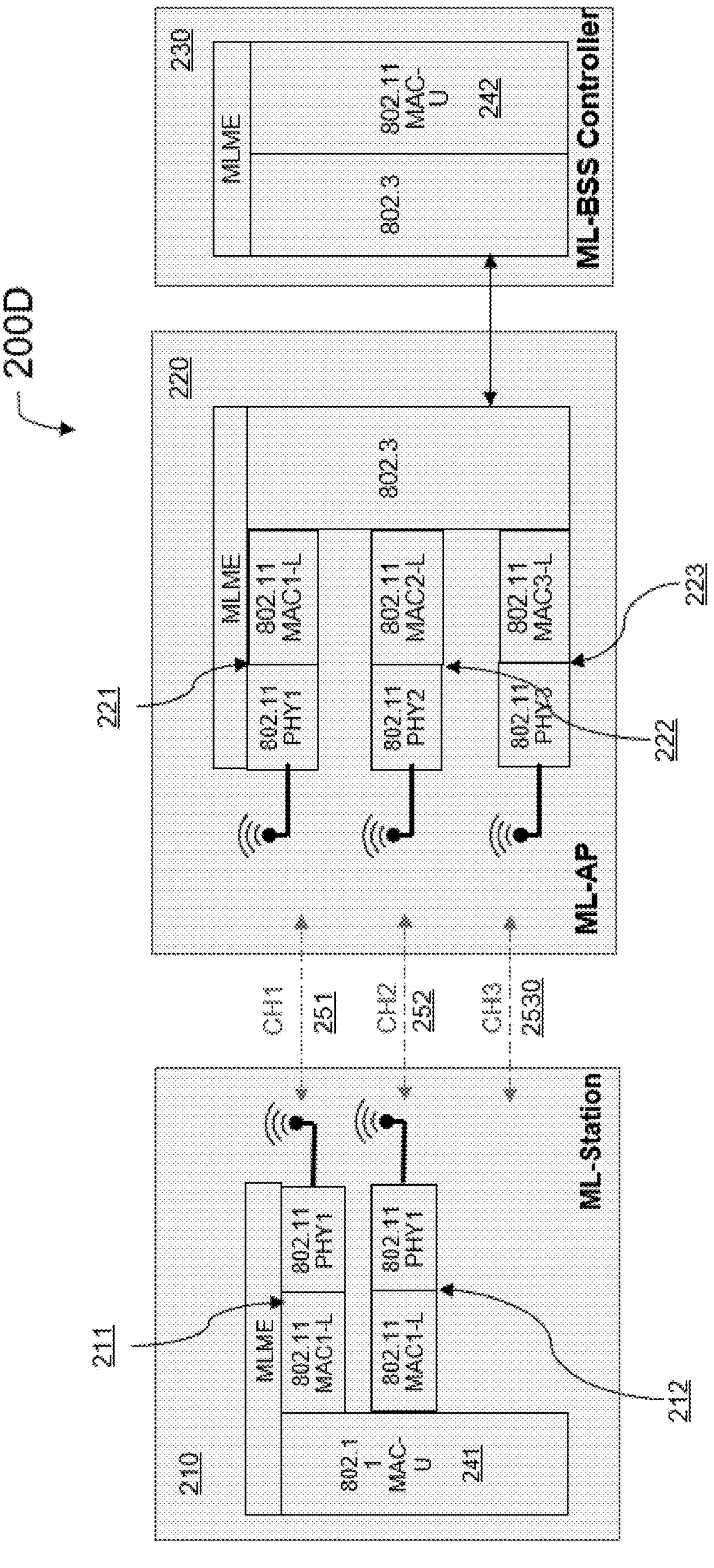
FIG. 2D illustrates a fourth example of ML station and access point system architecture.

In the fourth embodiment as shown in FIG. 2D, the capability of ML-STA 210 may be less than the ML-AP 220. In this example, the number of supported ML radios of ML-STA 210 is two, which is less than the number of ML radios of ML-AP 220, i.e. three. Therefore, the ML-STA 210 can establish up to two wireless links with the ML-AP 220, such as link1 251 and link2 252 in the association procedure. In order to support to dynamically re-configure ML radio, the ML-STA 210 may request a setup for link 2530 with the ML-AP 220 in the association procedure, which could be a virtual connection between the ML-STA 210 and ML-AP 220. If the association for this link 2530 is confirmed by the ML-AP 220, the ML-STA 210 sets the state of this link 2530 as associated but disabled, which can indicate that it has not been assigned to a ML radio yet. The ML-AP 220 also can set the state of link 2530 disabled to the ML-STA 210 until it becomes enabled. When the ML-STA 210 needs to operate on the channel CH3, it can re-assign a ML radio to operate on the link 2530 and re-configure the re-assigned ML-radio to make this link enabled. In this way, it can avoid the delay in the re-association procedure for the setup of the link 2530 on the operation of the channel CH3 between the ML-STA 210 and the ML-AP 220.

Figure 2E:
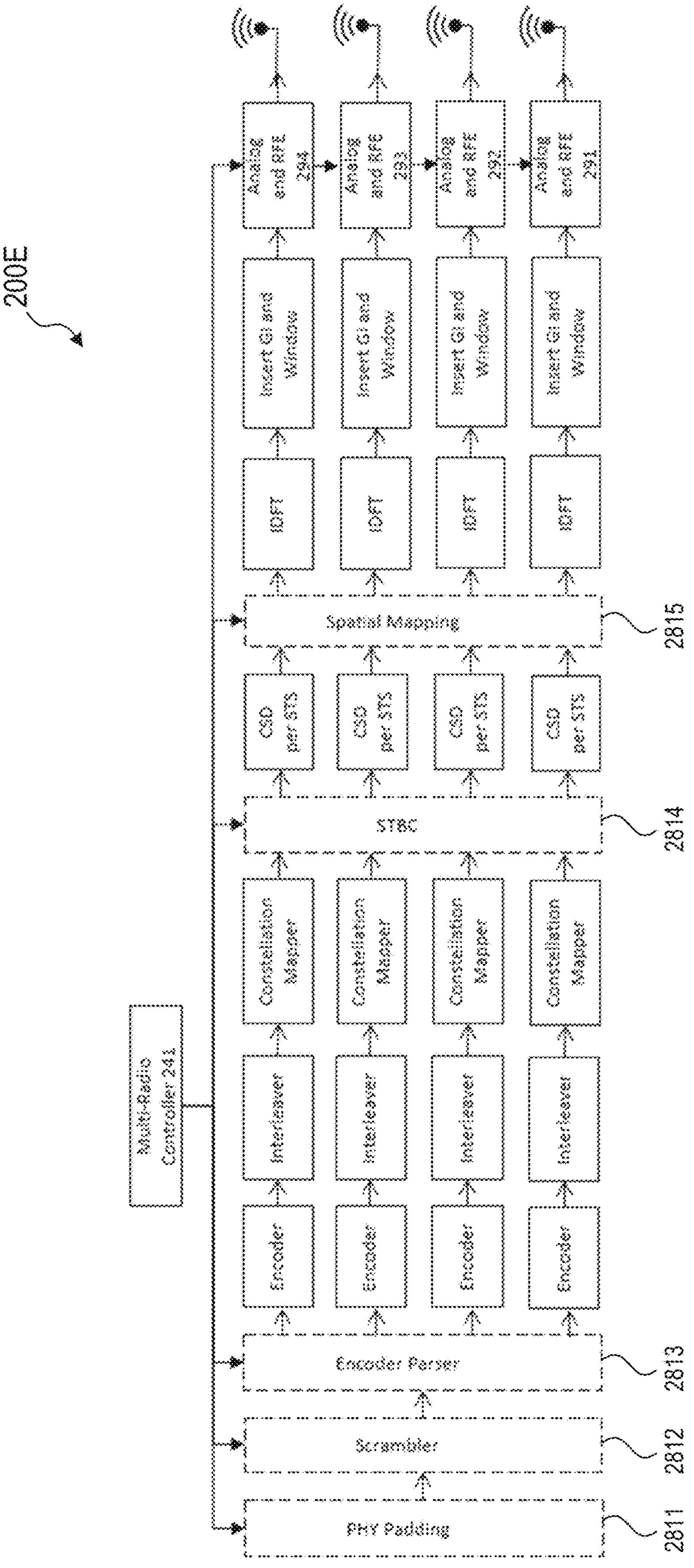
FIG. 2E illustrates a fifth example of ML station and access point system architecture.

In the fifth embodiment as shown in FIG. 2E, it illustrates an example ML-STA (or ML-AP) transmission functional block diagram 200*d*. The diagram can also be applicable to a ML-AP. In this example, the ML-STA with four transmission radio chains can form up to four links which can be operated on same or different radio frequency channel(s) under the control of Multi-Radio Controller 241.

Each transmission radio chain may have independent Encoder (e.g., BBC or LDPC), Inter-leaver (e.g., BBC or LDPC), Constellation Mapper, CSD for STS, IDFT, GI and Padding, Analog and RFE. The PHY padding, scrambler, Encoder Parser, STBC and Spatial Mapping can be configurable according to Multi-Radio setting.

Figure 2F:
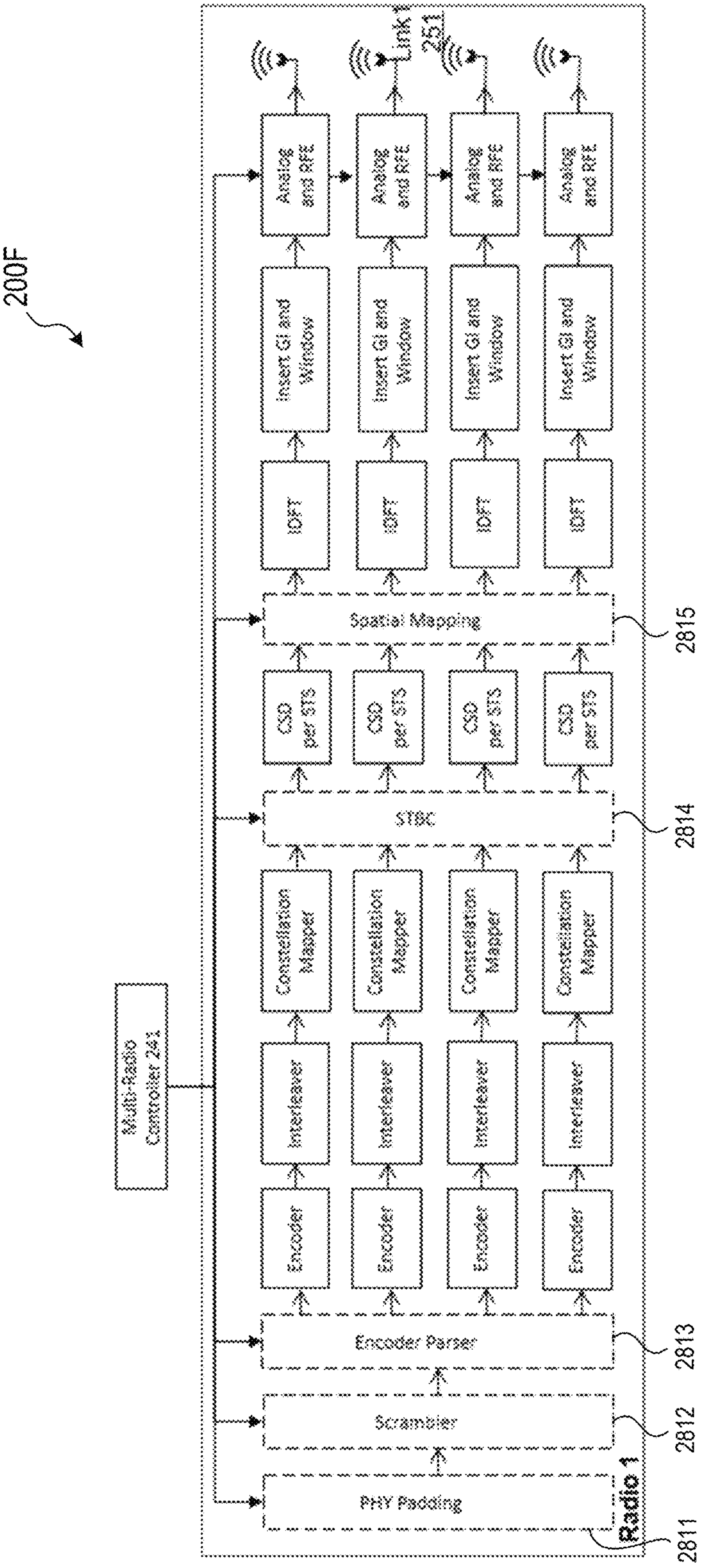
FIG. 2F illustrates a sixth example of ML station and access point system architecture.

In the sixth embodiment as shown in FIG. 2F, it illustrates an example transmission functional block diagram 200*e* of ML-STA being configured as a single link operated on the radio frequency channel (e.g. CH1). The Multi-Radio Controller 241 can configure the analog and RFE 291, 292, 293 and 294 to operate on the same channel (e.g., CH1), and makes the PHY padding 2811, scrambler 2812, Encoder Parser 2813, STBC 2814 and Spatial Mapping 2815 across all transmission radio chains to form a single link. The four transmission radio chains can support up to four spatial streams transmitted over the radio frequency channel.

Figure 2G:
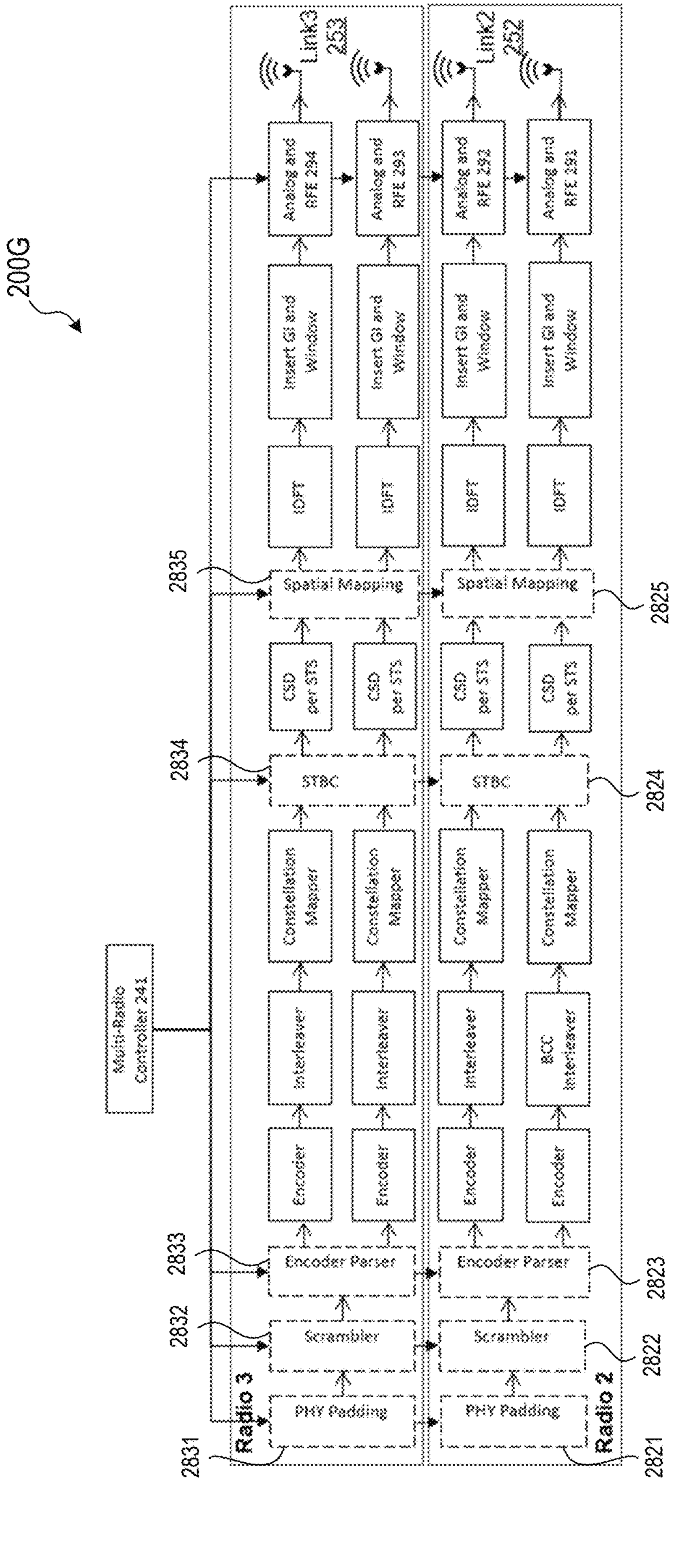
FIG. 2G illustrates a seventh example of ML station and access point system architecture.

In the seventh embodiment as shown in FIG. 2G, it illustrates an example transmission functional block diagram 200*f* of ML-STA being configured as two separate links operated on two different radio frequency channels (e.g. CH2 and CH3). The Multi-Radio Controller 241 can configure the analog and RFE 291 and 292 to operate on the same radio frequency channel (e.g. CH2) to form Link2 and configures the analog and RFE 293 and 294 to operate on another radio frequency channel (e.g. CH3) to form Link3. The Multi-Radio Controller 241 can allocate the PHY padding 2821, scrambler 2822, Encoder Parser 2823, STBC 2824 and Spatial Mapping 2825 for Link2, and allocates the PHY padding 2831, scrambler 2832, Encoder Parser 2833, STBC 2834 and Spatial Mapping 2835 for Link3. Therefore, each link can include up to two transmission radio chains to support two spatial steams over the radio frequency channel.

Figure 2H:
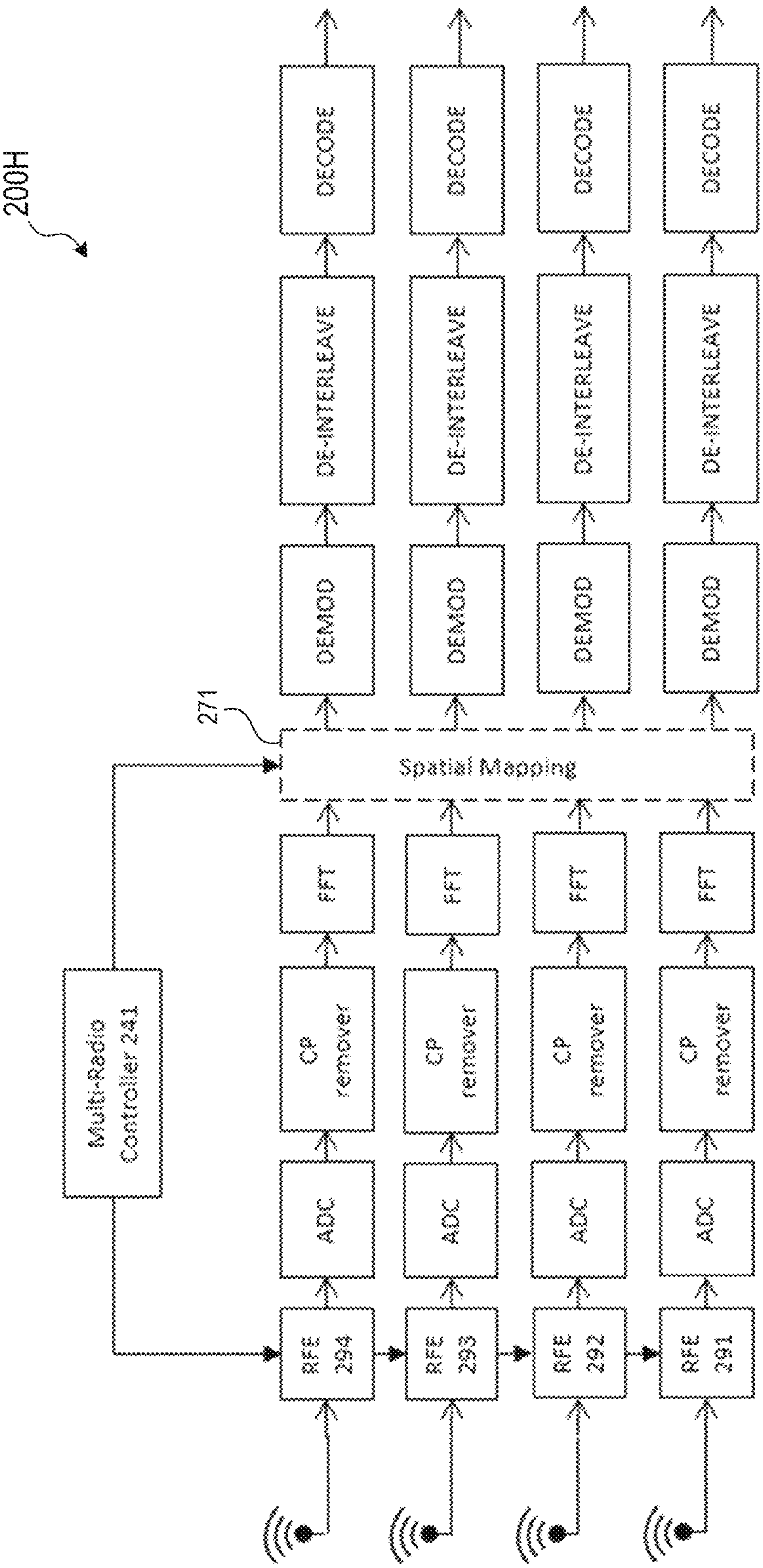
FIG. 2H illustrates an eighth example of ML station and access point system architecture.

In the eighth embodiment as shown in FIG. 2H, it illustrates an example ML-STA receiver functional block diagram 200*g*. The diagram can also be applicable to a ML-AP. In this example, the ML-STA with four receiving radio chains can form up to four links which can be operated on same or different radio frequency channel(s) under the control of Multi-Radio Controller 241.

Each receiving radio chain may have independent RFE (e.g. 291, 292, 293, or 294), ADC, CP remover, FFT, DEMOD, DE-INTERLEAVER, DECODE. A receiving radio chain can have a configurable Spatial Mapping 271 across receiving radio chains.

Figure 2I:
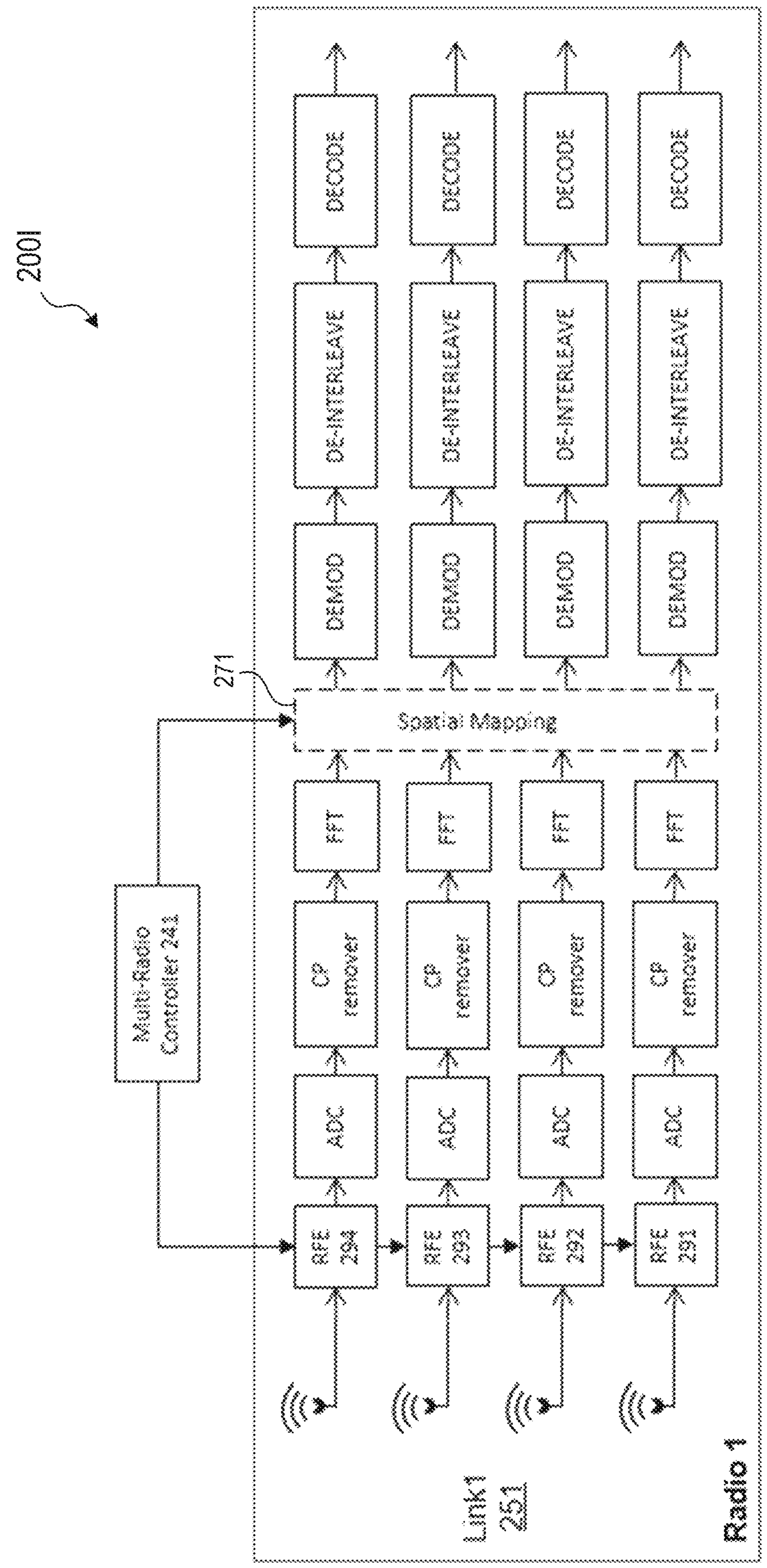
FIG. 2I illustrates a ninth example of ML station and access point system architecture.

In the ninth embodiment as shown in FIG. 2I, it illustrates an example receiver functional block diagram 200*h* of ML-STA being configured as single link operated on a radio frequency channel (e.g. CH1). The Multi-Radio Controller 241 can configure the RFE 291, 292, 293 and 294 to operate on the same radio frequency channel (e.g. CH1), and makes the Spatial Mapping 271 across all four receiving radio chains to form a single link. The four receiving radio chains can support up to four spatial streams received over the radio frequency channel.

In the tenth embodiment as shown in FIG. 2J, it illustrates an example receiver functional block diagram 200*i* of ML-STA being configured as two separate links operated on two different radio frequency channels (e.g. CH1 and CH2). The Multi-Radio Controller 241 can configure the RFE 291 and 292 to operate on the radio frequency channel (e.g. CH2) and configures the RFE 293 and 294 to operate on another radio frequency channel (e.g. CH3). The Multi-Radio Controller 241 can split the Spatial Mapping into two and allocate the Spatial Mapping 272 for Link2 and allocates the Spatial Mapping 273 for Link3. Therefore, each link can consist of two independent receiving radio chains to support two spatial streams received on each operating channel.

The ML-STA may communicate with ML-AP (or vice versa) to dynamic configure the transmission and receiving radio chains to form single link or multiple links, and/or change the operation channel frequency of each link to adapt to the radio environment variance for optimizing the multi-link performance. For example, when multiple radio channels are detected as idle, the ML-STA and ML-AP may communicate each other to form multiple links operating on those available radio frequency channels to transmit data on the multiple links so as to improve the data throughput. In another example, when only one radio channel is detected as idle, the ML-STA and ML-AP may communicate each other to form a single link with all transmission and receiving radio chains operating on this available radio frequency channel and transmit multiple data on multiple spatial stream of this link. Therefore, it can improve the data throughput in the limited air link bandwidth.

A ML-AP 220 may form a ML-BSS via any of:

1) assigning one link as a primary link. The corresponding radio channel may be a primary channel of the ML-AP.
2) assigning other link(s) as an alternate link(s). The corresponding radio channel(s) may be alternate channels of the ML-AP 220.
3) creating a unique BSSID, called ML-BSSID, to identify this ML-AP in the transmission over either the primary link or alternate link(s). Therefore, a ML-STA may treat the ML-AP as single network entity no matter their communication is through the primary link or alternate link(s).
4) transmitting over the primary link (or channel) a Beacon frame in a backward compatible frame format to carry the information of this ML-AP so that both ML-STAs and/or legacy STAs can receive and use this information for associations and data transmissions.
5) using the same set of EDCA parameters (e.g., backoff counter, CW, CWmin, CWmax, AIFSN, etc.) for downlink ML transmissions over the primary link and/or the alternate link(s) but maintain different NAV settings on the primary link and each alternate link. Each backoff counter may be corresponding to an access category such as Background (AC_BK), Best Effort (AC_BE), Video (AC_VI) or Voice (AC_VO). Initially, the backoff counters may be set to the default values of the contention windows (CWs) according to their access categories.
6) assigning a channel either a primary channel or an alternate channel as the ML operating channel with the associated ML-STA 210 so that the ML-STA 210 may only keep the ML operating on in listening and turn off other ML radios for power saving.

7) for further power saving, the ML-STA 210 may turn off the ML operating radio as well to enter the deep sleeping mode. The ML-AP 220 may use the wake-up radio to wake-up the ML operating radio of the ML-STA 210 from the deep sleeping mode when the ML-AP 220 has a data to send to the ML-STA 210.

A ML-STA may turn on a ML radio to listen to the transmissions in the unlicensed frequency band and search for Beacon frames. A ML-STA may turn on multiple ML-radios for fast searching over multiple radio channels simultaneously to reduce the searching time. If the ML-STA acquires a ML Beacon frame, it may need to determine whether it can associate with this ML-AP.

A ML-STA may use the same set of EDCA parameters (e.g. backoff counter, CW, CWmin, CWmax, AIFSN, etc.) for uplink ML transmissions over the primary link and/or the alternate link(s) but may maintain different NAV settings in the primary link and each alternate link. Each backoff counter may correspond to an access category such as Background (AC_BK), Best Effort (AC_BE), Video (AC_VI) or Voice (AC_VO). Initially, the backoff counters may be set to the default values of the contention windows according to their access categories.

The ML-AP 220 and ML-STA 210 may turn on all the ML radios at same time and keep them always-on for detecting and receiving the signal. However, this may cause much more power consumption, especially for the ML-STA 210. To address this power consumption problem, the ML-STA 210 may keep only one ML radio on to listen to signals from the ML-AP 220 via automatically switching the operating link and/or inform the change of ML operating channel to the ML-AP 220.

The ML-STA 210 may keep tracking the operation of each ML radio. When the ML-STA 210 finishes the ML transmissions, it may keep only one ML radio on as the operating link and turn off other ML radios (in the sleep mode) according to the link priority order. For example, ML radio 211 is the primary radio with the highest priority, the ML radio 212 and 213 are the alternate radios with the second priority and third priority. Therefore, the ML-STA may keep the ML radio 211 on as the operating link and other ML radios 212 and 213 off if the CH1 251 is determined to be idle. If the ML-STA determines the CH1 251 to be busy by the ML radio 211, it may turn on the ML radio 212 and/or 213 to listen to the signals from the ML-AP 220 over the channels CH2 252 and/or CH3 253 and turn off ML radio 211 to reduce their power consumption.

On the transmitting side, the ML-AP 220 may transmit a signal to the ML-STA 210, such as the ML TXOP setup, over:

(A) only the operating channel according to the link priority order to reduce the interference to other stations, or (B) multiple available channels at same time to reduce the probability of the operating channel mis-alignment between the ML-STA 210 and ML-AP 220.

Alternatively, the ML-STA 210 may send a message to ML-AP 220 to request to change the current ML operating channel, and switch to a new one after receiving the response from the ML-AP 220.

When going to send a user data, the ML-STA 210 may turn on all ML radios to find all the possible available channels and select the corresponding ones for the ML transmission.

Figure 3:
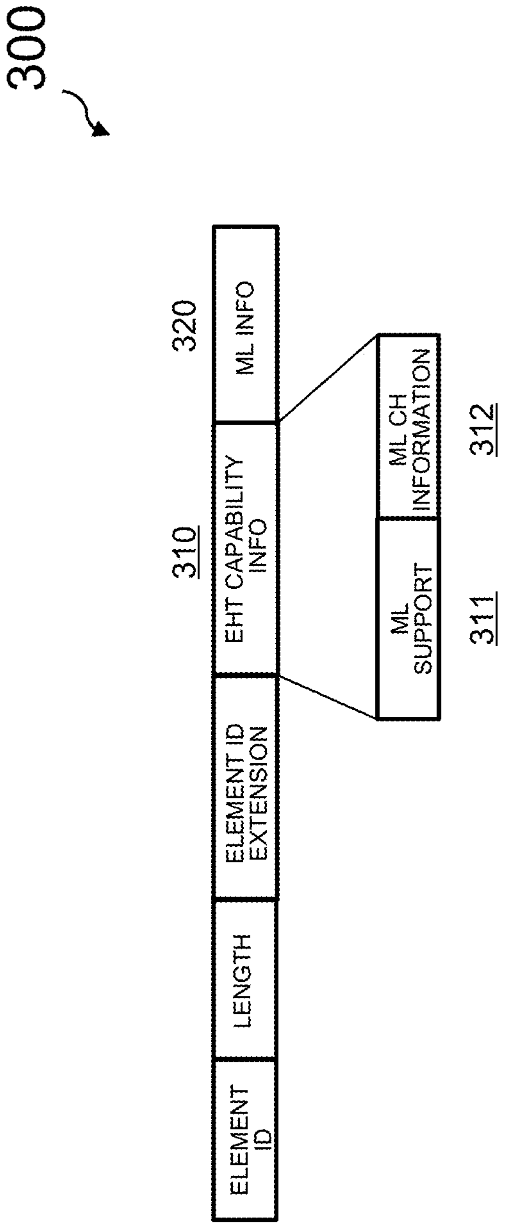
FIG. 3 illustrates an example extremely high throughput capability information element with multi-link support information

FIG. 3 illustrates an example block diagram 300 of Extremely High Throughput (EHT) Capability IE with the ML Support information. The Information Element 300, as shown in FIG. 3, may carry the information of EHT capability information and/or Multi-band operation information. The EHT Capability Info 310 may contain the ML Support 311 and ML Channel Information 312.

ML Support Information 311 may indicate the ML communication capability supported by the ML-AP (or ML-STA), and may include an indication that it does not support ML, an indication that it supports the selective ML transmission mode, an indication that it supports the joint ML transmission mode, an indication that it support the simplex ML transmission mode, and/or an indication that it supports the duplex ML transmission mode. The ML Support Information may also include the total number of multi-link radios and the maximum number of transmission and receiving radio chains which can be configured for a radio.

ML CH Information 312 may indicate the ML communication channels. The ML-AP may carry this information in the Beacon frame to indicate the primary channel and all the supported alternate channels. The ML-STA may carry this information in the ML Association Request or ML Re-Association Request to request or change the alternate channel(s) for the ML establishment or ML update. The primary channel and supported alternate channels may be identified by their radio frequency channel numbers.

The Multi-Band Info 320 may include the information of ML communication which the ML-AP is operating on. Example channels may include a 2.4 GHz, 5 GHz, or 6 GHz band.

Figure 4:
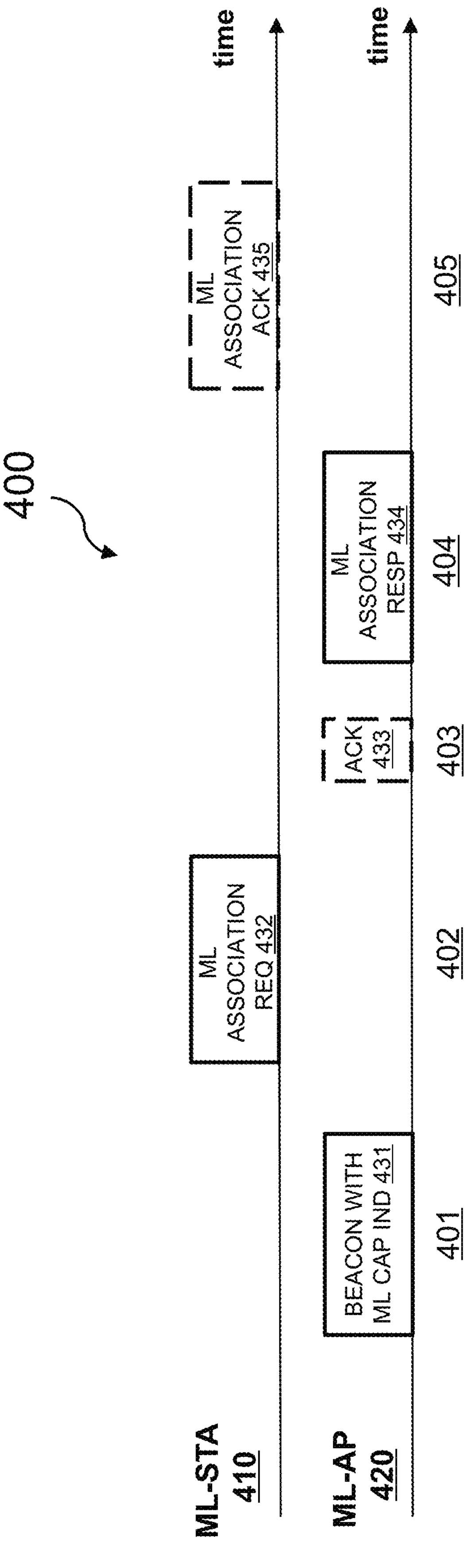
FIG. 4 illustrates an example signaling process of multi-link communication establishment based on association request and response message exchanges.

FIG. 4 illustrates an example signaling process 400 of ML establishment based on association request and response message exchange.

In step 401, as shown in FIG. 4, a ML-AP 420 may be a ML-AP capable access point. In an embodiment, the ML-AP 420 broadcasts the ML Support Information 431 in an EHT Capability Information Element of a Beacon frame, or in a Probe Response frame.

In step 402, a ML-STA 410 in a ML-BSS coverage area may listen to Beacon or Probe Response frames and determine whether neighbor APs can support the ML feature. If the ML-STA 410 receives a Beacon frame and determines that AP(s) is of ML capability, it may send a ML Association Request 432 to the ML-AP(s), i.e. ML-AP 420 in this example. The ML Association Request 432 includes an ML Capability Information with a proposed ML configuration information such as a primary channel and alternate channels of the ML-STA.

The ML-STA 410 may have and use the MAC address associated to MLME of ML-STA to communicate with the ML-AP 420 via its MAC address associated to MLME. The ML-STA 410 may include and use a ML Identifier (ML ID) to identify the configuration of ML communication link between the ML-STA 410 and ML-AP 420, and indicate the ML operating channel for the power saving listening mode in the ML Association Request message. The ML ID could be the MAC address associated to the radio of ML-STA (or ML-AP) or other type of identifier. During ML association procedure, the ML-STA may set the MAC address of its MLME to SA and the MAC address (or ML ID) of the radio to TA, and set the MAC address of ML-AP MLME to DA and the MAC address (or ML ID) of the ML-AP radio for this communication to RA in the ML association request.

In step 403, when receiving the ML Association Request from a ML-STA, the ML-AP 420 may optionally send an acknowledgement message 433 to the ML-STA 410 first, and then process the ML Association Request.

In step 404, after the ML association processing is completed, the ML-AP 420 may send a ML Association Response 434 to acknowledge whether or not the ML association is granted in which the ML-AP may set the MAC address of its MLME to SA and the MAC address (or ML ID) of this ML-AP radio to TA, and set the MAC address of ML-STA MLME to DA and the MAC address (or ML ID) of the ML-STA radio for this communication to RA in the ML association response. If granted, the ML-AP 420 includes in the ML Association Response the ML configuration with the primary channel and alternate channels information and the ML operating channel indication for the ML-STA 410. If the ML-AP 420 operates more than two alternate links, it may selectively assign a set of alternate link(s) to the ML-STA 410 so as to distribute user traffic and balance load among the all the multi-links.

In step 405, the ML-STA 410 may optionally send an ML Association ACK 435 to confirm the ML association with the ML-AP 420 if the ML configuration in the ML Association Response message is different from the proposed ML configuration in the ML Association Request message but is accepted by the ML-STA 410.

After the ML association is established, the ML-STA 410 may use the EDCA mechanism for the uplink ML transmission over the primary link and/or alternate link(s). The ML-STA 410 may use one set EDCA parameters for the MLs but maintains individual NAV settings for the primary link and each alternate link.

The ML-STA 410 may update the established MLs, such as adding a new alternate link or remove an existing alternate link.

In some embodiments, a ML-STA 410 may update the alternate link(s) via sending a ML Re-Association Request to the associated ML-AP 420. The alternate link(s) of ML-STA 410 may be updated after receiving the ML Re-Association Response from the ML-AP 420.

In some embodiments, a ML-STA 410 may disassociate with the ML-AP 420 via sending a ML Disassociation Request. The ML association with the ML-AP 420 may be then released.

In some embodiments, the ML-STA 410 may not receive a Beacon frame from the ML-AP 420, and the ML-STA 410 may send a ML Probe Request message for the ML-BSS information. If the ML-AP 420 receives the ML Probe Request message, it may respond with a ML Probe Response message within a given time period.

The ML communication can be operated to support different service requirements through the enhanced service class parameters of the MLME SAP primitives. For example, the enhanced service class parameters may include any of:

1) Low Latency QoS (LL-QoS)
2) High Reliable QoS (HR-QoS)
3) High Throughput (HT-QoS)

The enhanced service parameters can be added to the existing service class attribute or in a new attribute of enhanced service class in MA-UNITDATA.request ( ).

FIGS. 5A-5D illustrate example utilizing the ML radio processes to support low latency transmission, high reliable transmission and high throughput transmission over the wireless interface.

Figure 5A:
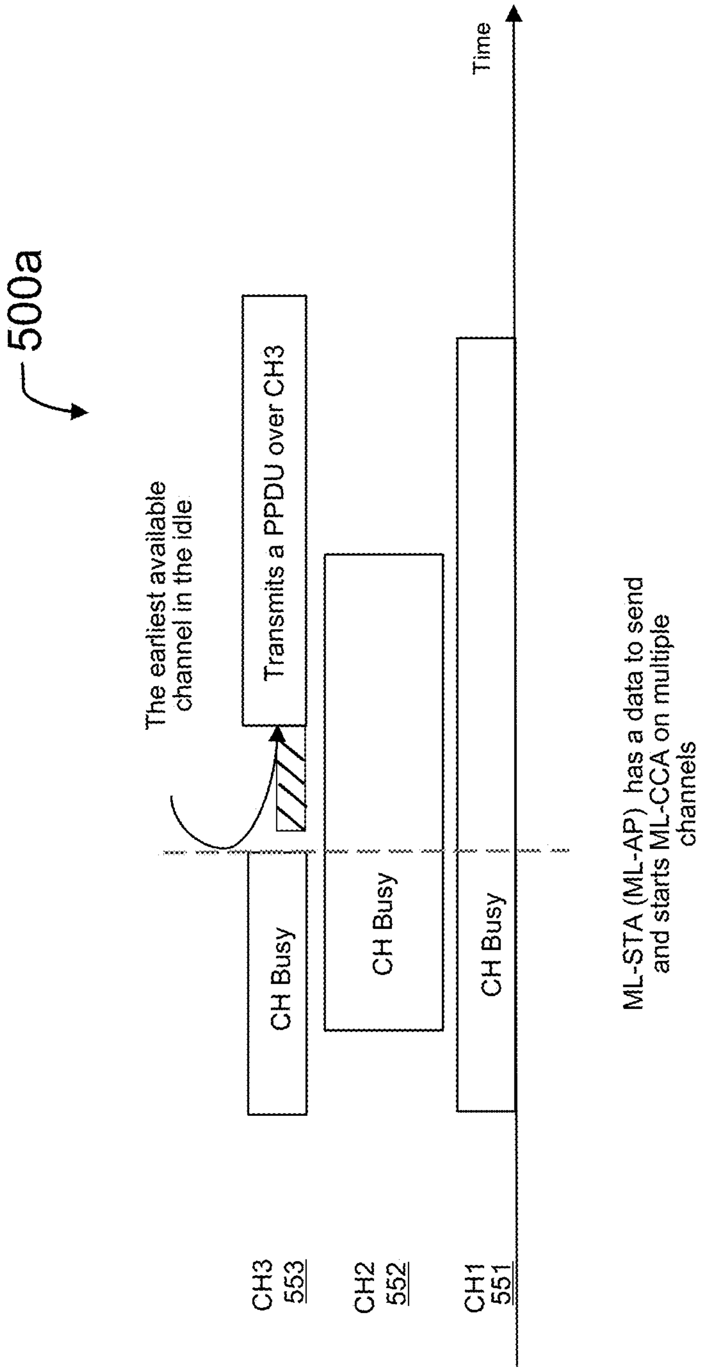
FIG. 5A illustrates a first example signaling process to utilize multi-link operation for support of low latency, high reliable or high throughput transmissions.

In a first embodiment, as shown in FIG. 5A, it illustrates an example 500A of supporting the low latency transmission via MLs. When a ML-STA (or ML-AP) is instructed by the application via setting LL-QoS in the enhanced service class and the expected arrival time of the packet to transmit low latency user data to an associated ML-AP (or ML-STA), it may perform the virtual carrier sensing via ML NAVs on CH1 551, CH2 552 and CH3 553. If at least one of those channels is not set by the virtual sensing, the ML-STA (or ML-AP) may simultaneously perform the physical ML-CCA sensing on the channels not set by the ML NAVs to find the earliest available channel(s) for low latency transmission. In this example, the ML-STA (or ML-AP) may find the link 553 (CH3) is the earliest available channel among the MLs after the ML backoff counter corresponding to the access category reaches to 0 and the ML-CCA detects the CH3 in idle. It can then transmit a PPDU over the link 553 on the radio channel CH3, or it can re-configure radio 1 and radio 2 to operate on the same channel CH3 and make radio 1, radio 2 and radio 3 coordinated to support multiple spatial streams on a single channel, and then transmits multiple PPDUs together in multiple spatial streams on the radio frequency channel CH3. In this way, it could be able to fully utilize the ML radio capacity for optimizing the performance.

Figure 5B:
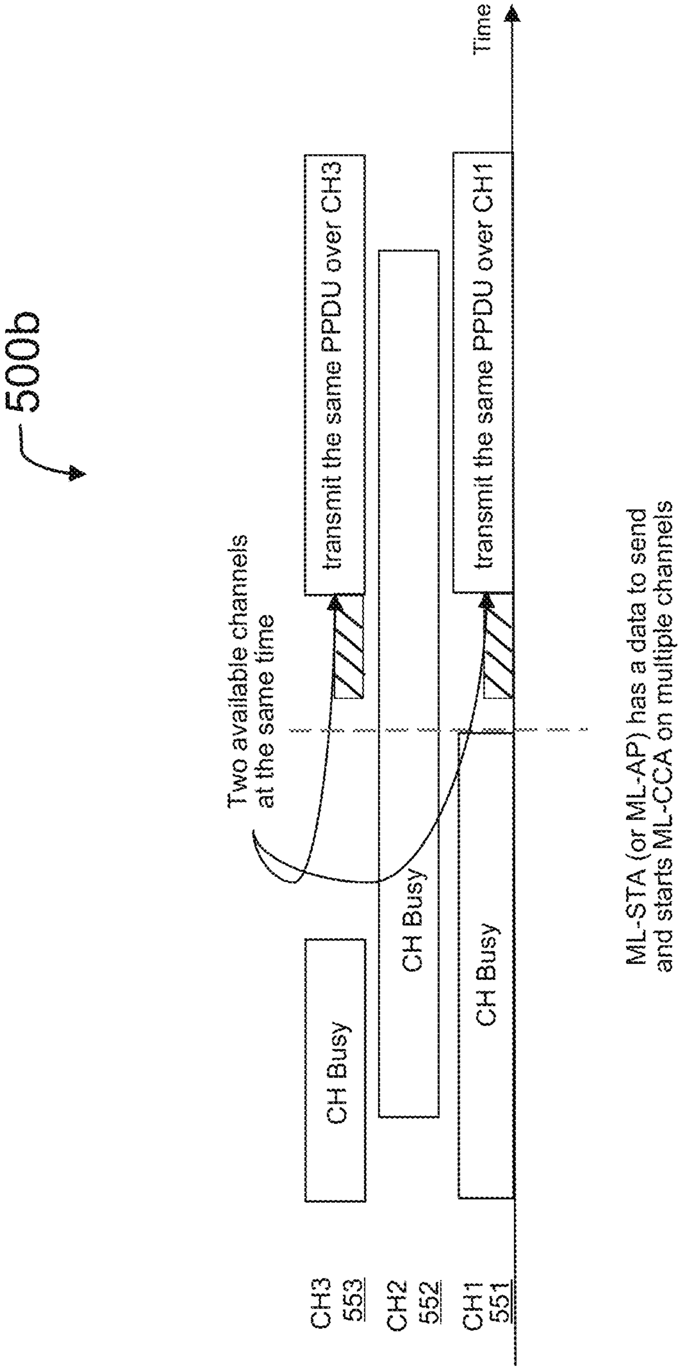
FIG. 5B illustrates a second example signaling process to utilize multi-link operation for support of low latency, high reliable or high throughput transmissions.

A second embodiment 500B, as shown in FIG. 5B, illustrates an example of supporting the high reliable transmission via MLs. When a ML-STA (or ML-AP) is instructed by the application via setting HR-QoS in the enhanced service class to send out user data in the reliable way to an associated ML-AP (or ML-STA), it may perform the virtual carrier sensing via ML NAVs on CH1 551, CH2 552 and CH3 553. If at least two of those channels are not set by the virtual sensing, the ML-STA (or ML-AP) may simultaneously perform the physical ML-CCA sensing on those channels not set by the ML NAVs to find the two or more available channels for the reliable transmission. In this example, the ML-STA (or ML-AP) may find the link 551 (CH1) and the link 553 (CH3) are the two earliest available channels among the MLs after the ML backoff counter corresponding to the access category reaches to 0 and the ML-CCA detection detects both CH1 and CH3 idle. It may then transmit the same PPDU of the same sequence number over the link 551 and the link 553 at the same time.

On the receiving side, the ML-AP (or ML-STA) may perform a selection on the multiple received MPDUs in the MAC layer to get the best quality MPDU according to the channel quality or error checking indication on the link 551 and the link 553. The ML-AP (or ML-STA) may combine the received signals from the link 551 and the link 553 in the ML PHYs to improve the SINR as well.

Figure 5C:
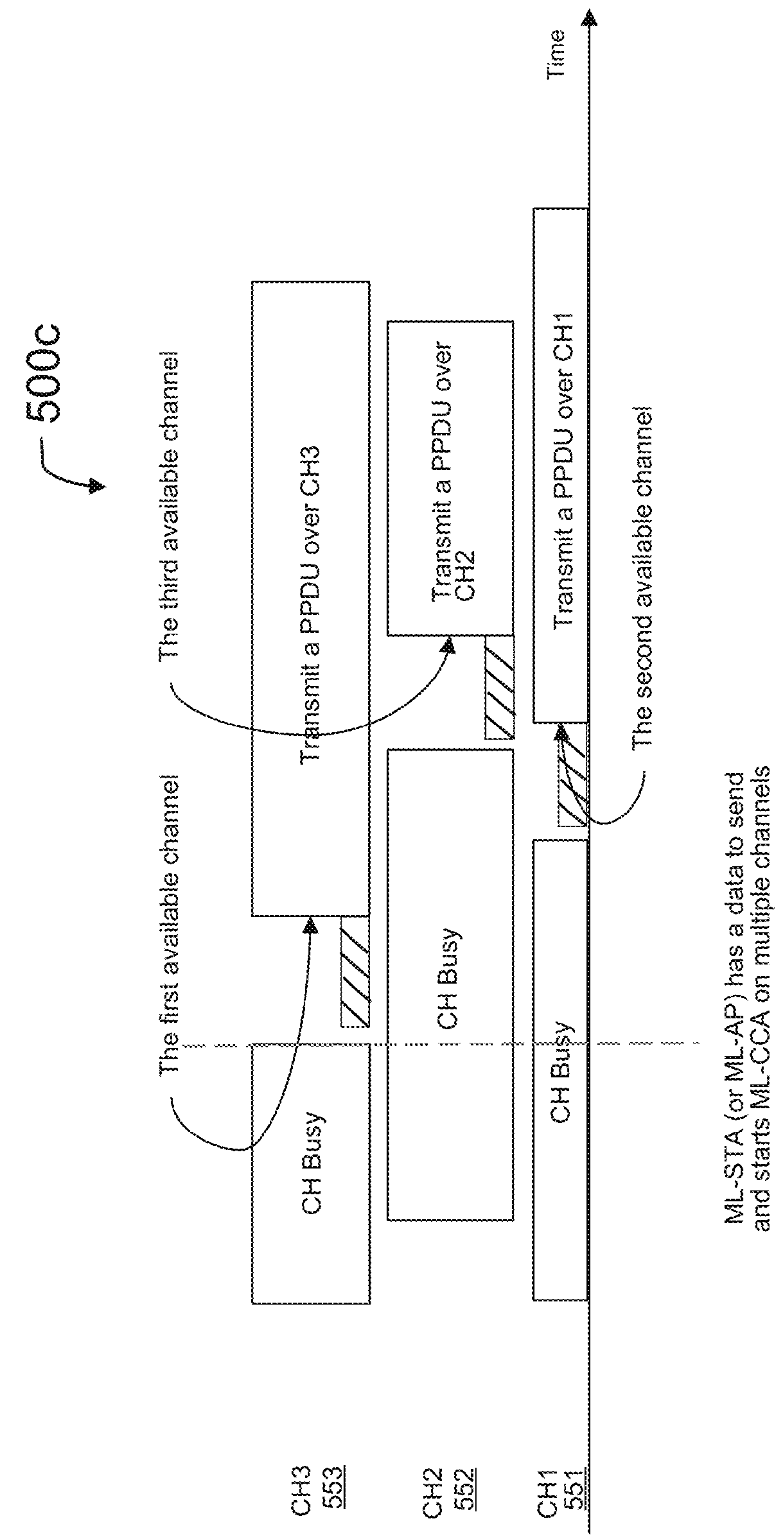
FIG. 5C illustrates a third example signaling process to utilize multi-link operation for support of low latency, high reliable or high throughput transmissions.

A third embodiment 500C, as shown in FIG. 5C, illustrates an example of supporting the high data throughput transmission via MLs. When a ML-STA (or ML-AP) is instructed by the application via setting HT-QoS in the enhanced service class to send out user data in the high throughput to an associated ML-AP (or ML-STA), it may perform the virtual carrier sensing via ML NAVs on CH1 551, CH2 552 and CH3 553. If any of those channels are not set by the virtual sensing, the ML-STA (or ML-AP) may perform the physical ML-CCA sensing on those channels not set by the ML NAVs to find all the available channels for the high throughput transmission. The ML-STA (or ML-AP) may continue monitoring the remaining channel availability during the ML transmission(s) and initiate another ML transmission if another link is detected as being available. In this example, the ML-STA (or ML-AP) may first find the link 553 (CH3) as available among the three MLs after the ML backoff counter corresponding to the access category reaches to 0 and the ML-CCA detects it idle. It then may transmit a PPDU over the link 553 (CH3) and continue monitoring other links 551 and 552. If the link 551 (CH1) is detected idle, the ML-STA (or ML-AP) may transmit a new PPDU of a new sequence number over the link 551 (CH1). Similarly, the ML-STA (or ML-AP) may transmit a new PPDU of a new sequence number over the link 552 (CH2) once it is detected as idle and the existing ML transmission over CH1 and CH3 are still going on. The MAC-U of the ML-STA (or ML-AP) may coordinate ML transmissions over different channels. As each ML link is operated independently, the transmissions over ML links may not be necessary to end at the same time. If the ML-STA and ML-AP only supports simplex communication mode, a padding may be inserted at the end of the PPDU transmission for alignment. Otherwise, if the ML-STA and ML-AP support duplex ML communication mode, the padding at the end of PPDU may not be necessary and the acknowledgement frame (e.g. BA, ACK, etc.) can be transmitted immediately in the SIFS time after the PPDU transmission completion.

The receiving ML-AP (or ML-STA) of the high throughput traffic can perform the MAC layer aggregation on the received PSDUs. In this way, the ML-STA (or ML-AP) can aggregate more available links to increase the data throughput for the high throughput application.

If the ML transmission succeeds, the ML-STA (or ML-AP) may reduce the contention window size corresponding to the access category and reset the backoff counter to the CW. If the ML transmission fails, the ML-STA (or ML-AP) may double the contention window size corresponding to that access category and reset the backoff counter to the CW. Then, the ML-STA (or ML-AP) re-transmits the failed PPDU with the same sequence number over the MLs.

Figure 5D:
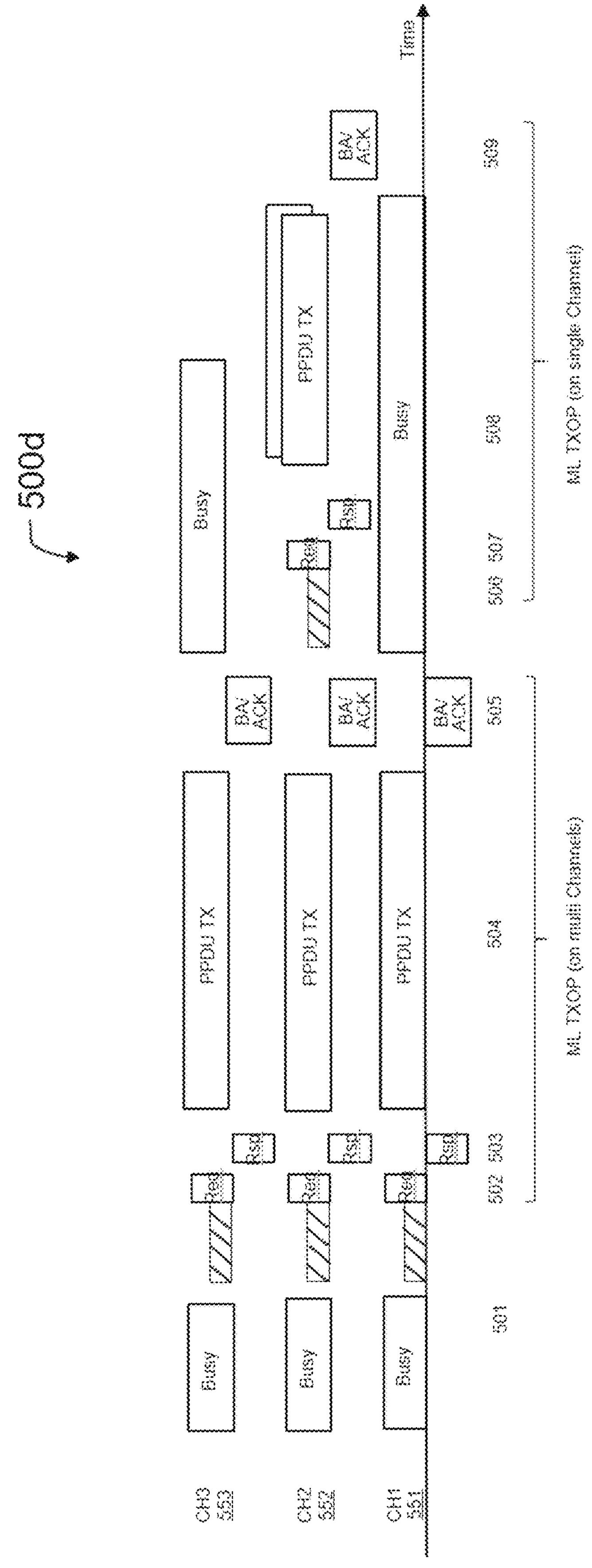
FIG. 5D illustrates a fourth example signaling process to utilize multi-link operation for support of low latency, high reliable or high throughput transmissions.

A fourth embodiment 500D, as shown in FIG. 5D, illustrates an example of dynamically configuring multi-radios and switching operation channel(s) to adapt the radio channel environment change for optimizing the ML performance.

In this example, a ML-STA is of three radios 211, 212 or 213 which can operate on any frequency channel CH1, CH2 or CH3.

In step 501, the multi-radio 211, 212 or 213 of ML-STA 210 in FIG. 2 can be set to operate on CH1, CH2 and CH3 independently in the listening mode to receive the transmissions from the ML-AP and other stations.

In step 502, the ML-STA can perform ML CCA on the channel(s) not set by the ML NAVs to find the available channel(s), e.g. CH1, CH2 and CH3. It can then transmit a request control frame (e.g. RTS or MU-RTS) with ML transmission setup information to acquire the ML-TXOP on those available channels.

In step 503, the ML-AP 220 can configure the ML reception on the requested channels and sends a response control frame (e.g. CTS or MU-CTS) on each channel that the request control frame is received (e.g. CH1 CH2 and CH3) to confirm the ML communication setup.

In step 504, the ML-STA 210 can start ML transmissions on the acquired channels (e.g. CH1, CH2 and CH3).

In step 505, the ML-AP 220 can receive the PPDUs over multi-links on the channels CH1, CH2 and CH3, and acknowledges the reception of PPDUs if they are decoded successfully. If the ML TXOP (on multi-channel) is over, the ML-STA may start another acquisition if it has more data to send.

In step 506, the ML-STA 210 can perform ML CCA on the channel not set by the ML NAVs to find the available channel(s). As the channel CH1 and CH3 are set as busy by its NAV, the ML-STA may only send the request control frame (e.g. RTS or MU-RTS) on the channel CH2 with setup information of ML transmissions on CH2.

In step 507, the ML-AP 220 can configure the ML reception on the requested channel(s) and sends a response control frame (e.g. CTS or MU-CTS) on the channel that the request control frame is received (e.g. CH2) to confirm the ML communication setup.

In step 508, the ML-STA 210 can start the ML transmission on link1, link2 and link3 as multi-streams on the channel CH2 to optimize the data throughput.

In step 509, the ML-AP 220 can receive the PPDUs over multi-links on the channel CH2 and acknowledges the reception of PPDUs if they are decoded successfully.

A similar procedure may be applicable to ML-AP initiated the acquisition of TXOP and ML transmissions.

In this way, the ML communication can be over single available channel or multiple available channels for adaptation to the radio channel environment changes to achieve the best ML performance.

In order to support the ML communication, the IEEE802.11 protocol reference architecture may need to be enhanced to separate the MAC layer into the upper MAC (i.e. MAC-U) and the lower MAC (i.e. MAC-L).

FIG. 6 illustrates an example protocol reference architecture 600 for support of ML communication. The MAC-U 610, on the transmission side (TX), may consist of some functions such as A-MSDU aggregation, PS Defer Queuing, Sequence Number Assignment, MSDU Integrity Protection, Fragmentation, Packet Number Assignment, MPDU Encryption and Integrity Protection.

The MAC-U 610, on the receiving side (RX), may consist of functions such as A-MSDU aggregation, MSDU Integrity Protection, Defragmentation, Replay Detection, Block Ack Buffering and Reordering, MPDU Decryption and Integrity Check.

The MAC-U 610 can be implemented within ML-STA 210 or ML-AP 220 as shown in FIG. 2. It may be located in a separate network entity like ML-BSS Controller 230 in FIG. 2.

The MAC-L 620, on the transmission side (TX), may be associated to a PHY of the ML radio which is operating on a frequency channel as shown in FIG. 2. MAC-L 620 may consist of some functions such as MPDU Header and CRC Creation, MPDU Aggregation. The ML radio (including MAC-L 620) can be implemented within the same ML-STA 210 or the same ML-AP 220, as shown in FIG. 2.

The MAC-L 620, on the receiving side (RX), is associated to a PHY of the ML radio which is operating on a frequency channel, as shown in FIG. 2. MAC-L 620 may consist of some functions such as Duplicate Removal, HARQ-ACK/HARQ-NACK/BACK/ACK, Address Filtering, MPDU Header and CRC Validation, MPDU De-aggregation. The ML radio (including MAC-L 620) can be implemented within the ML-STA 210 or the ML-AP 220 as shown in FIG. 2.

Figure 7A:
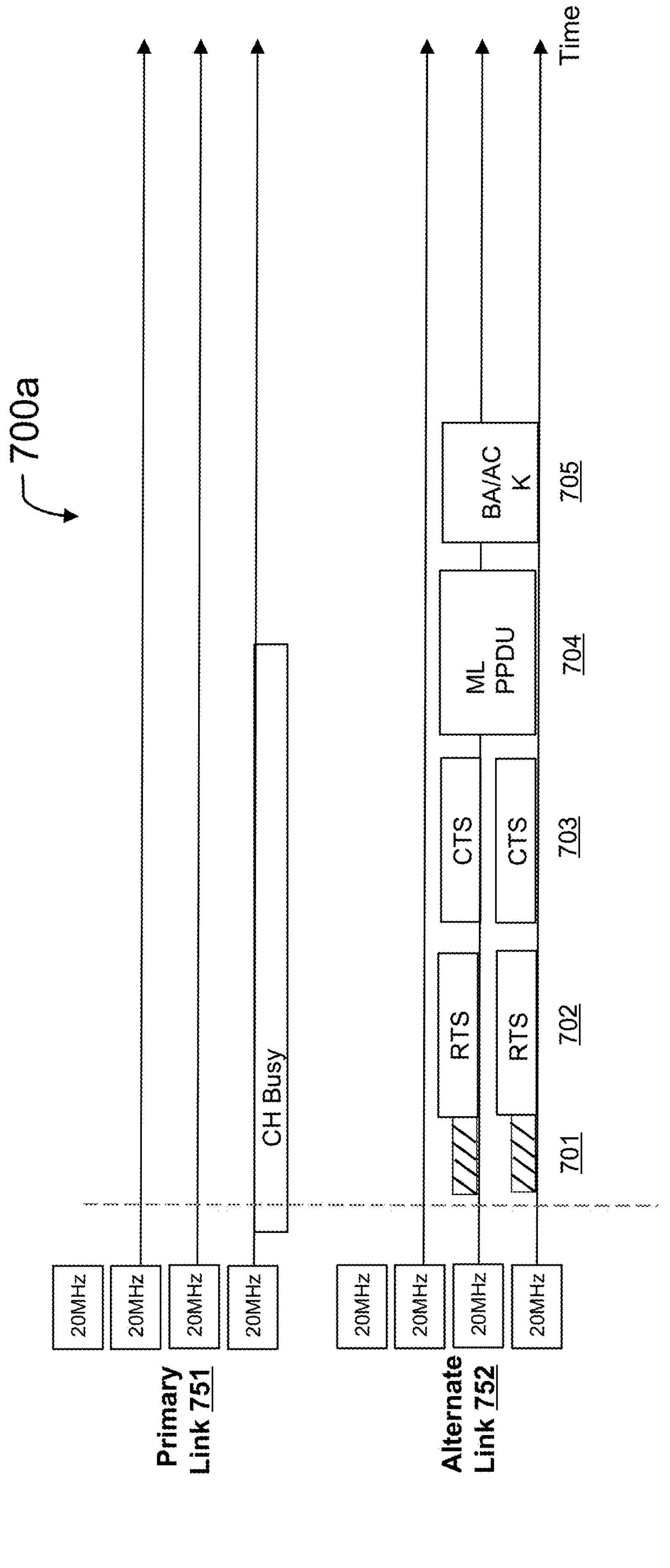
FIG. 7A illustrates a first example signaling process for multi-link transmission protection establishment.
Figure 7B:
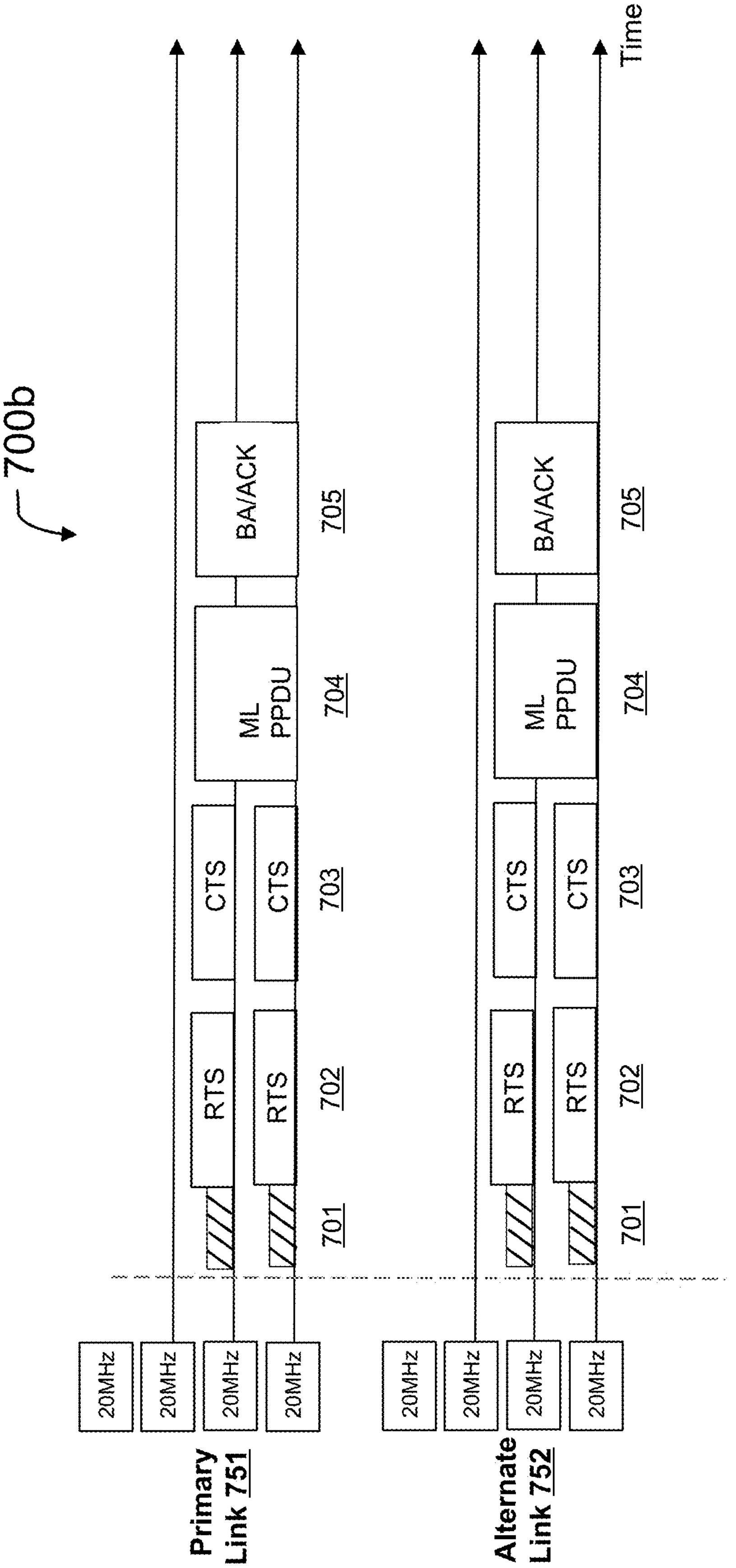
FIG. 7B illustrates a second example signaling process for multi-link transmission protection establishment.

FIGS. 7A-7B illustrate example signaling processes 700*a*, 700*b* for ML transmission protection establishment for ML transmissions. The ML-AP 220 and ML-STA 210 may have established the MLs through the ML association and response message exchanges. The ML-AP 220 and ML-STA 210 may agree that the primary link 751 is operating on a radio channel with the maximum channel bandwidth 80 MHz and the alternate link 752 is operating on another radio channel with the maximum channel bandwidth 80 MHz, as an example.

In a first embodiment, as shown in FIG. 7A, a ML transmission protection may be established when the ML primary channel is busy, and the ML alternate channel is idle. In a second embodiment, as shown in FIG. 7B, a ML transmission protection may be established when both ML primary and alternate channels are idle.

In step 701, the MAC-U 610 may receive a transmission request from the application with an enhanced service class such as QoS-LL, QoS-HR or QoS-HT. It may instruct each ML MAC-L 620 to perform virtual carrier sensing with NAVs to get possibly available ML channels. The ML MAC-L 620 may report the available ML channel to the ML MAC-U 610. Based on the enhanced service class requirement and the report from each ML MAC-L 620, the ML MAC-U 610 may then instruct the corresponding ML radio (e.g. ML MAC-L/PHY) to perform the ML physical carrier sensing on those possibly available channel(s) using the same EDCA parameters such as backoff counter settings of the access categories, etc. If the ML channel is sensed as idle by the corresponding ML radio and the backoff counter of the access category reaches to 0, the ML MAC-L 620 may report to the ML MAC-U 610 with the ML channel information.

In step 702, the ML MAC-U 610 may instruct the corresponding ML radio to transmit the RTS or MU-RTS message over the ML channels. The RTS/MU-RTS may optionally include the information of ML channels to be used in the following transmissions when the transmitting station needs to select the best channel(s) within the multiple available channels, as an example. In the first embodiment in FIG. 7A, the RTS/MU-RTS is transmitted over two 20 MHz bandwidth channels in alternate link 752 as those two 20 MHz bandwidth channels are detected as idle. In the second embodiment in FIG. 7B, both primary link 751 and alternate link 752 are detected as idle. Therefore, the RTS/MU-RTS can be transmitted over two 20 MHz bandwidth channels in the primary link 751 and two 20 MHz bandwidth channels in the alternate link 752.

In step 703, after receiving the RTS/MU-RTS request, the receiving ML station (either ML-STA or ML-AP) may send a CTS/MU-CTS over those ML channels to confirm the MLs. The CTS/MU-CTS may optionally include the information of ML channels to confirm the channel(s) to be used in the following transmissions. The ML-STA and ML-AP may use the RTS/MU-RTS and CTS/MU-CTS to establish a ML TXOP for the following ML transmissions over those ML channels. Other STAs that receive RTS/MU-RTS and/or CTS/MU-CTS over those channels may set their NAVs to prevent from sending data during the ML TXOP period.

In step 704, the requesting station transmits the ML PPDU over the ML channels. In the first embodiment in FIG. 7A, a ML PPDU may be sent over the earliest available ML channel for the low latency application. In the second embodiment in FIG. 7B, the same ML PPDU are sent over the primary link 751 and the alternate link 752 for the reliable application, the different ML PPDUs over the primary link 751 and the alternate link 752 respectively for the high throughput application.

After receiving the ML PPDU(s), the receiving station may combine the received signals in the ML PHYs to improve the SINR or select the best quality data packet in MAC-U for the reliable transmission or perform the packet aggregation in the MAC-U for the high throughput application.

In step 705, the receiving station may transmit an acknowledgement if the received MPDU succeeds. If the transmitting station does not receive the acknowledgement in a given time, it may declare the ML transmission a failure and will re-transmit the failed MSDU after the re-transmission timer expires.

Figure 8:
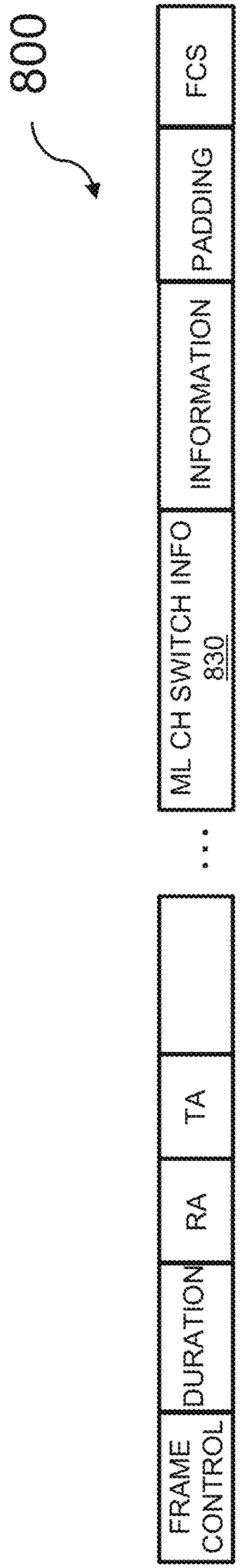
FIG. 8 illustrates an example MAC frame format with the multi-link channel switch information.

FIG. 8 illustrates an example MAC header format 800 for an ML control frame. The MAC header format of a ML control frame may be used for, for example, a BA/ACK, RTS/MU-RTS, CTS/MU-CTS or ML Channel Switch Request/Response.

The MAC header may include frame control (FC) field to indicate the MAC frame type and other information about the frame. The MAC header may include a transmission duration of this frame, and any of a receiving address (RA), a transmission address (TA), and a destination address (DA).

The MAC header may include a ML channel switch information (ML CH SWITCH INFO) field 830 to indicate the new ML operating channel(s) of ML-radio(s) and/or the time of switching the ML operating channel(s), and/or the number of transmission/receiving radio chains for the succeeding ML communications. The ML-STA may use this message to request switching any ML radio to operating on a new operating channel for the succeeding ML communications.

Figure 9A:
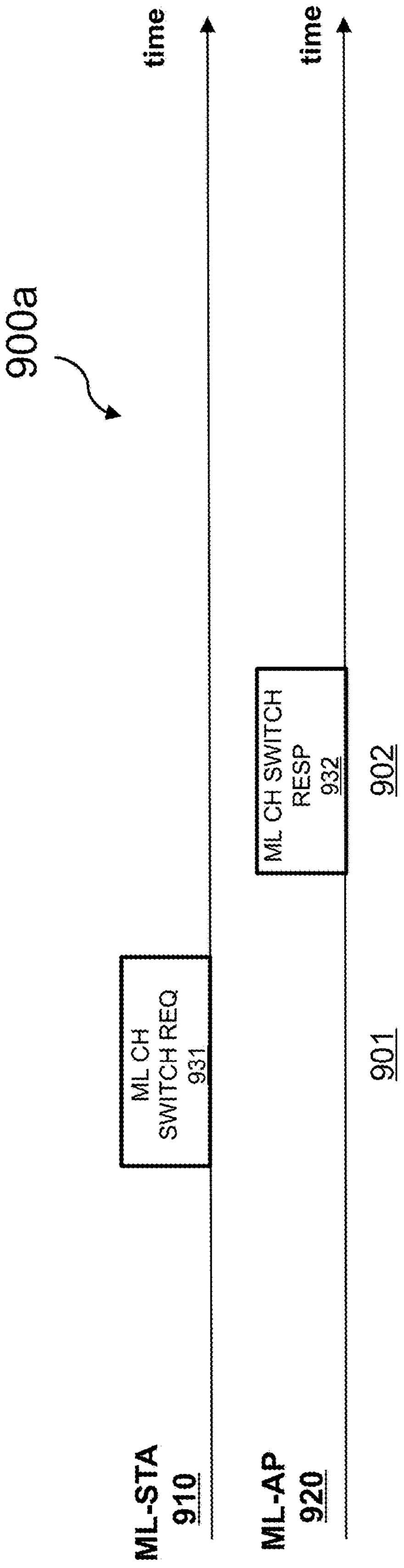
FIG. 9A illustrates a first example signaling process of multi-link channel switching and dynamic link reconfiguration.
Figure 9B:
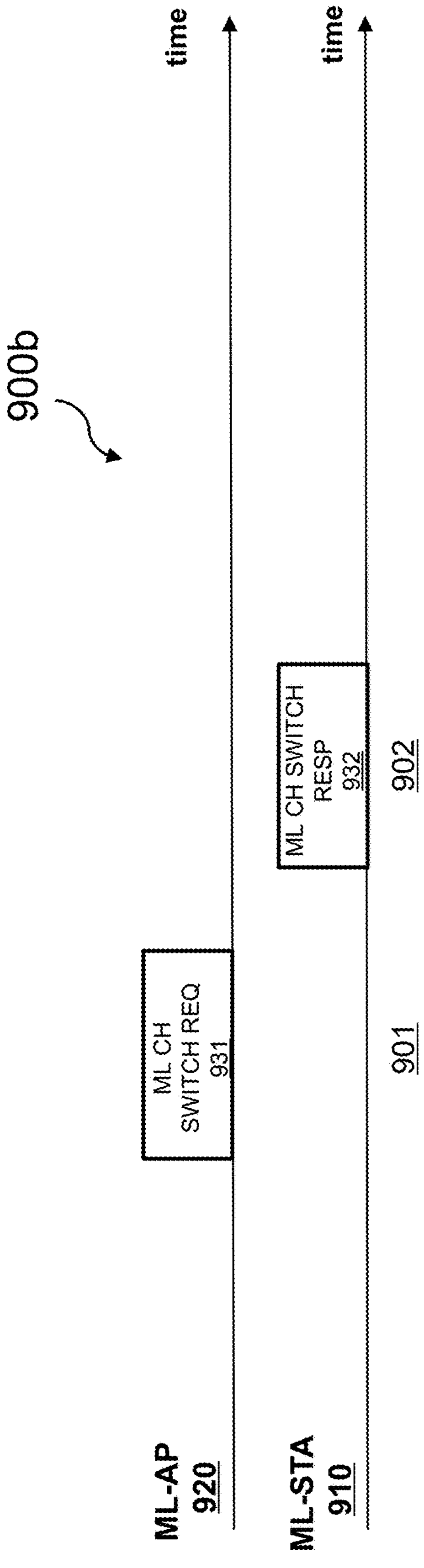
FIG. 9B illustrates a second example signaling process of multi-link channel switching and dynamic link reconfiguration.

FIGS. 9A-9B illustrate example signaling processes 900*a*, 900*b* for switching the ML operating channel(s) and dynamic link reconfiguration.

FIG. 9A shows an example signaling process 900*a* for ML-STA initiated ML operation channel switching and dynamic link reconfiguration.

In step 901, the ML-STA 910 may send a request message, e.g. ML Channel Switch Request message 931 (or MU-RTS request message), to the ML-AP 920 to request change of the ML operating channel(s) in some situation, like the current ML operating channel is experiencing an interference or over loaded or dynamically switching to adapt radio frequency channel variance condition and acquired TXOP. The request control message, e.g. ML Channel Switch Request message 931 (or MU-RTS request message) can carry the new ML operation channel information 830 for the ML-radio(s). The ML-STA 910 may use the request message to indicate to operate on the channel which the currently disabled link is on.

In step 902, the ML-AP 920 receives the request control message, e.g. ML Channel Switch Request message 931 and processes the request. The ML-AP 920 sends the response control message, e.g. ML Channel Switch Response message 930 to indicate whether or not the request is granted and include the ML operation channel information 830 to confirm the new ML operation channel and/or switching time.

If the request is granted, the ML-STA 910 can configure the ML-radio(s) and switch the operation channel(s) of ML radio(s) to the new one at the switching time if it is included, or immediately if not included. Meanwhile, the ML-AP 920 may need to re-configure the ML-radio(s) accordingly to support the operation channel changes requested by the ML-STA 910. If the new channel is associated to a disabled link, the ML-STA 910 can re-assign a ML radio to the currently disabled link and re-configure this ML radio to operate on this channel to make the disabled link to be enabled. Otherwise if the request is not granted, the ML-STA 910 shall keep the exiting ML operating channel for the future ML communications.

FIG. 9B shows an example signaling process 900*b* for ML-AP initiated ML operation channel switching and dynamic link reconfiguration.

Figure 10:
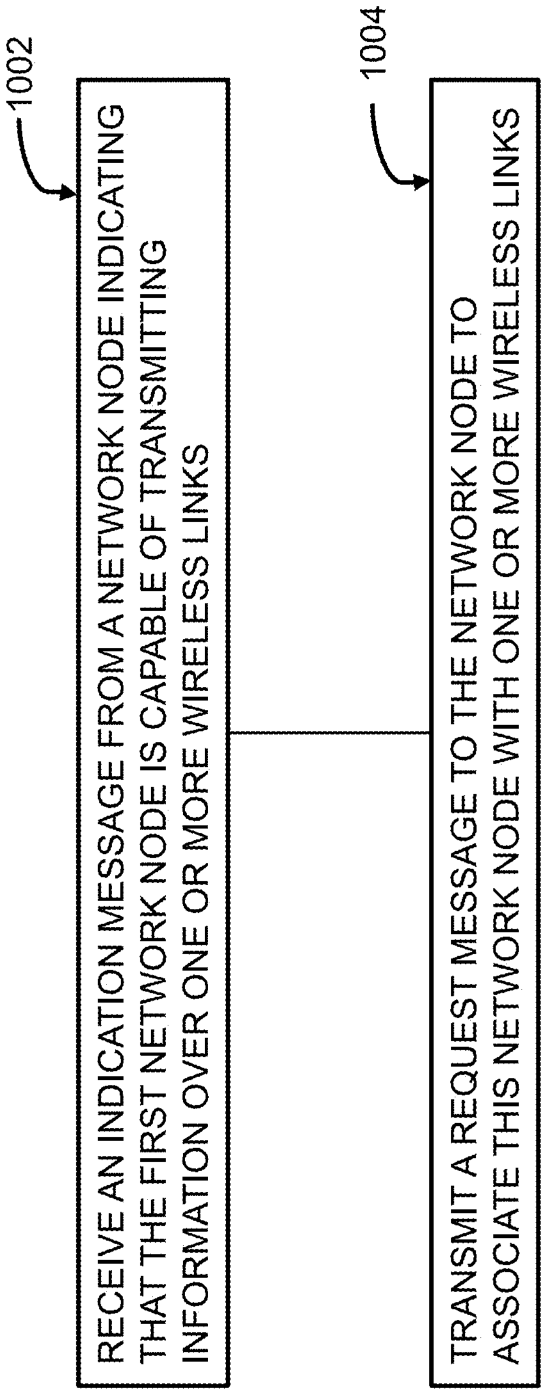
FIG. 10 illustrates a block diagram of a method for multi-link operation.

FIG. 10 illustrates a block diagram of a method for multi-link operation. In a first exemplary embodiment, a method includes receiving, by a station, an indication message from a network node indicating that the network node is capable of transmitting information over one or multiple wireless links (block 1002). The indication message may include information identifying that an access point is capable of multi-link transmission, as illustrated in FIGS. 5A-5C, for example.

The method also includes transmitting, by the station, a first request message to the network node to associate the network node with one or multiple wireless links (block 1004). The first request message may include a ML association request to a network node indicating a request of establishing a multi-link connection, as illustrated in Step 402 of FIG. 4, for example.

In some embodiments, the method includes receiving, by the station, a control message from the network node, wherein the control message identifies a multi-radio configuration that includes the one or more wireless links.

In some embodiments, the method includes transmitting, by the station, a control request message to the network node over the one or more wireless links, the control request message including information for a configuration of a multi-link transmission and a receiving chain, and receiving, by the station, a control response message from the network node, wherein the station is configured to establish a multi-link transmission opportunity (TXOP) over the one or more wireless links configured based on the received configuration of the multi-link transmission.

In some embodiments, the control request message includes a ready-to-send (RTS) or a multi-user RTS (MU-RTS) message, and wherein the control response message includes clear-to-send (CTS) or multi-user clear-to-send (MU-CTS) message.

In some embodiments, the first request message includes a multi-link association request indicating a request to establish a connection to the one or more wireless links.

In some embodiments, the method includes receiving, by the station, a first response message from the network node, the first response message indicating an acknowledgement that the network node associated the station with the one or more wireless links.

In some embodiments, the indication message includes multi-link support information in any of an extremely high throughput (EHT) capability information element of a beacon frame and a probe response frame.

In some embodiments, the method includes transmitting, by the station, a multi-link re-association request message to the network node, the multi-link re-association request message updating association between the station and any of the one or more wireless links by any of adding a new alternate link and adding an existing alternate link to the station.

In some embodiments, the method includes transmitting, by the station, a disassociation message to each network node associated with the station, each network node configured to release any association between the station and any of the one or more wireless links based on receiving the disassociation message.

In some embodiments, the method includes transmitting, by the station, a ready-to-send (RTS) or multi-user ready-to-send (MU-RTS) message to the network node associated with the station over the one or more wireless links associated with the station; and receiving, by the station, a clear-to-send (CTS) or multi-user clear-to-send (MU-CTS) message from the network node associated with the station over the one or more wireless links associated with the station to establish a multi-link transmission opportunity (TXOP) across the one or more wireless links.

In some embodiments, a second station not associated with the one or more wireless links is configured to update a network-allocation vector (NAV) to prevent transmission of data during a multi-link transmission opportunity time period based on receiving any of a RTS/MU-RTS message and a CTS/MU-CTS message.

In some embodiments, the CTS message includes any of at least one preferred multi-link connection for a selective multi-link transmission and at least two preferred multi-link connections for a joint multi-link transmission.

In some embodiments, the method includes separating, by any of the station and the network node, a media access control (MAC) into an upper MAC part and a lower MAC part.

In some embodiments, the lower MAC part associated with a physical layer protocol of multi-link radio controlling physical layer operations to either transmit or receive a radio signal over a frequency channel with an Enhanced distributed channel access (EDCA) mechanism.

In some embodiments, the upper MAC part coordinates operation of the lower MAC part by configuring EDCA parameters in the lower MAC part and performs any of selecting and aggregation of received packets from the one or more wireless links.

In some embodiments, the first request message includes multi-link capability information and a proposed multi-link configuration.

In some embodiments, the method includes acquiring, by the station, channel information for a first transmission associated with an enhanced service class by one of multi-link virtual carrier sensing and multi-link physical carrier sensing on the one or more wireless links.

In some embodiments, the method includes determining, by the station, a multilink communication configuration between the station and the network node based on a multi-link identifier identifying the multilink communication configuration in the indication message; and indicating a multi-link operating channel for a power saving listening mode in the first request message.

In some embodiments, the method includes turning off all wireless links except for one wireless link based on identifying the one wireless link in a multi-link operating channel, wherein the network node is configured to assign one of a primary channel and an alternate channel as the multi-link operating channel with the station.

In some embodiments, the method includes receiving, by the station, signals on the one wireless link by switching from the one wireless link to another wireless link and transmitting a change of the multi-link operating channel to the network node.

In another embodiment, a method for wireless communication comprises transmitting, by a network node, an indication message to a station, the indication message indicating that the network node is capable of transmitting information over at least one wireless link. The method also includes receiving, by the network node, a first request message including multi-link capability information to the network node. The method also includes associating one or more wireless links with the station based on the multi-link capability information.

In some embodiments, the method includes transmitting, by the network node, a control message to the station, wherein the control message identifies a multi-radio configuration that includes the one or more wireless links.

In some embodiments, the method includes receiving, by the network node, a control request message from the station over the one or more wireless links, the control request message including information for a configuration of a multi-link transmission and a receiving chain, and transmitting, by the network node, a control response message to the station, wherein the station is configured to establish a multi-link transmission opportunity (TXOP) over the one or more wireless links configured based on the received configuration of the multi-link transmission.

In some embodiments, a configuration of the station includes setting a state of a first link of the one or more wireless links to an enabled state if the first link was in a disabled state.

In some embodiments, the control request message includes a ready-to-send (RTS) or a multi-user RTS (MU-RTS) message, and wherein the control response message includes clear-to-send (CTS) or multi-user clear-to-send (MU-CTS) message.

In some embodiments, the method includes transmitting, by the network node, an acknowledgement message to the station indicating an acknowledge that the network node received the first request message.

In some embodiments, the first request message includes a multi-link association request indicating a request to establish a connection to any of the one or more wireless links.

In some embodiments, the method includes transmitting, by the network node, a first response message to the station, the first response message indicating that the station is associated with the one or more wireless links.

In some embodiments, the indication message includes multi-link support information in any of an extremely high throughput (EHT) capability information element of a beacon frame and a probe response frame.

In some embodiments, the method includes receiving, by the network node, a multi-link re-association request message from the station, the multi-link re-association request message updating any association between the station and the one or more wireless links by any of adding a new alternate link and adding an existing alternate ink to the station.

In some embodiments, the method includes receiving, by the network node, a disassociation message from the station; and releasing, by the network node, any association between the station and the one or more wireless links based on receiving the disassociation message.

In some embodiments, the method includes receiving, by the network node, a ready-to-send (RTS) or multi-user ready-to-send (MU-RTS) message from the station over the one or more wireless links associated with the station; and transmitting, by the network node, a clear-to-send (CTS) or multi-user clear-to-send (MU-CTS) message to the station over the one or more wireless links associated with the station to establish a multi-link transmission opportunity (TXOP) across the one or more wireless links.

In some embodiments, a second station not associated with the one or more wireless links is configured to update a network-allocation vector (NAV) to prevent transmission of data during a multi-link transmission opportunity time period based on receiving any of an RTS/MU-RTS message and a CTS/MU-CTS message.

In some embodiments, the CTS/MU-CTS message includes any of at least one preferred multi-link connection for a selective multi-link transmission and at least two preferred multi-link connections for a joint multi-link transmission.

In some embodiments, the first request message includes multi-link capability information and a proposed multi-link configuration.

In some embodiments, the method includes transmitting, by the network node, a multi-link identifier indicating a multilink communication configuration between the station and the network node, wherein the station is configured to identify a multi-link operating channel for a power saving listening mode in the first request message.

In some embodiments, the method includes assigning, by the network node, one of a primary channel and an alternate channel as a multi-link operating channel with the station, wherein the station is configured to turn off all wireless links except for one wireless link based on identifying the one wireless link in the multi-link operating channel.

Figure 11:
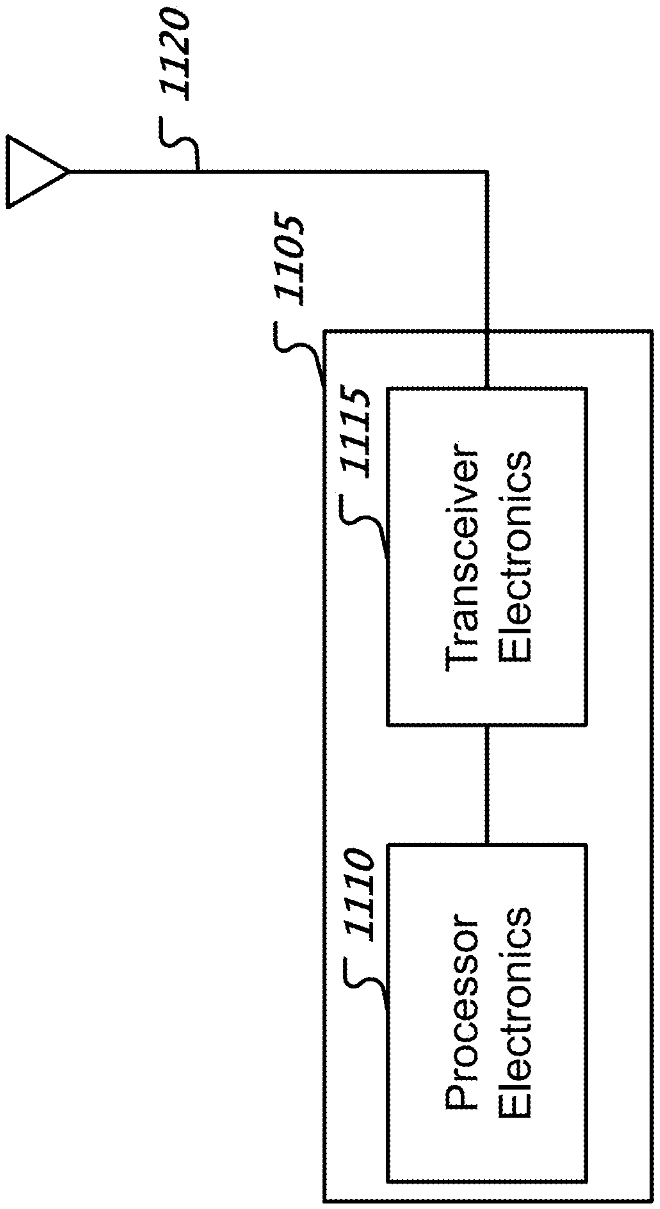
FIG. 11 is a block diagram representation of a portion of a hardware platform.

FIG. 11 is a block diagram representation of a portion of a hardware platform. A hardware platform 1105 such as a network device or a base station or a wireless device can include processor electronics 1110 such as a microprocessor that implements one or more of the techniques presented in this document. The hardware platform 1105 can include transceiver electronics 1115 to send and/or receive wired or wireless signals over one or more communication interfaces such as antenna 1120 or a wireline interface. The hardware platform 1105 can implement other communication interfaces with defined protocols for transmitting and receiving data. The hardware platform 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the hardware platform 1105.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:

receiving, by a multiple link station, an indication message from a multiple link access point (ML-AP), the indication message indicating that the ML-AP is capable of transmitting information over one or more wireless links;

transmitting, by the multiple link station, a first request message to the ML-AP, wherein the ML-AP is configured to associate the multiple link station to the one or more wireless links based on receiving the first request message, wherein the first request message includes a multi-link capability information and a proposed multi-link configuration including a primary channel and alternate channels of the multiple link station;

transmitting, by the multiple link station, a control request message to the ML-AP over the one or more wireless links, the control request message including information for a configuration of a multi-link transmission and a receiving chain; and receiving, by the multiple link station, a control response message from the ML-AP, wherein the multiple link station is configured to establish a multi-link transmission opportunity (TXOP) over the one or more wireless links configured based on the configuration of the multi-link transmission.

2. The method of claim 1, further comprising:

receiving, by the multiple link station, a control message from the ML-AP, wherein the control message identifies a multi-radio configuration that includes the one or more wireless links.

3. The method of claim 1, wherein the control request message includes a ready-to-send (RTS) or a multi-user RTS (MU-RTS) message, and wherein the control response message includes clear-to-send (CTS) or multi-user clear-to-send (MU-CTS) message.

4. The method of claim 1, further comprising:

transmitting, by the multiple link station, a ready-to-send (RTS) or multi-user ready-to-send (MU-RTS) message to the ML-AP associated with the multiple link station over the one or more wireless links associated with the multiple link station; and receiving, by the multiple link station, a clear-to-send (CTS) or multi-user clear-to-send (MU-CTS) message from the ML-AP associated with the multiple link station over the one or more wireless links associated with the multiple link station to establish a multi-link transmission opportunity (TXOP) across the one or more wireless links.

5. The method of claim 1, wherein a second multiple link station not associated with the one or more wireless links is configured to update a network-allocation vector (NAV) to prevent transmission of data during a multi-link transmission opportunity time period based on receiving any of a RTS/MU-RTS message and a CTS/MU-CTS message.

6. A method for wireless communication, comprising:

transmitting, by a multiple link access point (ML-AP), an indication message to a multiple link station, the indication message indicating that the ML-AP is capable of transmitting information over at least one wireless link;

receiving, by the ML-AP from the multiple link station, a first request message including multi-link capability information and a proposed multi-link configuration including a primary channel and alternate channels of the multiple link station to the ML-AP;

associating one or more wireless links with the multiple link station based on the multi-link capability information;

receiving, by the ML-AP, a control request message from the multiple link station over the one or more wireless links, the control request message including information for a configuration of a multi-link transmission and a receiving chain; and transmitting, by the ML-AP, a control response message to the multiple link station wherein the multiple link station is configured to establish a multi-link transmission opportunity (TXOP) over the one or more wireless links configured based on the received configuration of the multi-link transmission.

7. The method of claim 6, further comprising:

transmitting, by the ML-AP, a control message to the multiple link station, wherein the control message identifies a multi-radio configuration that includes the one or more wireless links.

8. The method of claim 6, wherein a configuration of the multiple link station includes setting a state of a first link of the one or more wireless links to an enabled state if the first link was in a disabled state.

9. The method of claim 6, wherein the control request message includes a ready-to-send (RTS) or a multi-user RTS (MU-RTS) message, and wherein the control response message includes clear-to-send (CTS) or multi-user clear-to-send (MU-CTS) message.

10. The method of claim 6, further comprising:

receiving, by the ML-AP, a ready-to-send (RTS) or multi-user ready-to-send (MU-RTS) message from the multiple link station over the one or more wireless links associated with the multiple link station; and transmitting, by the ML-AP, a clear-to-send (CTS) or multi-user clear-to-send (MU-CTS) message to the multiple link station over the one or more wireless links associated with the multiple link station to establish a multi-link transmission opportunity (TXOP) across the one or more wireless links.

11. The method of claim 6, wherein a second multiple link station not associated with the one or more wireless links is configured to update a network-allocation vector (NAV) to prevent transmission of data during a multi-link transmission opportunity time period based on receiving any of an RTS/MU-RTS message and a CTS/MU-CTS message.

12. An apparatus for wireless communication, comprising:

a processor that is configured to perform a method, the processor configured to:

receive, by a multiple link station, an indication message from a multiple link access point (ML-AP), the indication message indicating that the ML-AP is capable of transmitting information over one or more wireless links;

transmit a first request message to the ML-AP, wherein the ML-AP is configured to associate the multiple link station to the one or more wireless links based on receiving the first request message, wherein the first request message includes a multi-link capability information and a proposed multi-link configuration including a primary channel and alternate channels of the multiple link station;

transmit a control request message to the ML-AP over the one or more wireless links, the control request message including information for a configuration of a multi-link transmission and a receiving chain; and receive a control response message from the ML-AP, wherein the multiple link station is configured to establish a multi-link transmission opportunity (TXOP) over the one or more wireless links configured based on the configuration of the multi-link transmission.

13. The apparatus of claim 12, wherein the processor is further configured to:

receive a control message from the ML-AP, wherein the control message identifies a multi-radio configuration that includes the one or more wireless links.

14. The apparatus of claim 12, wherein the control request message includes a ready-to-send (RTS) or a multi-user RTS (MU-RTS) message, and wherein the control response message includes clear-to-send (CTS) or multi-user clear-to-send (MU-CTS) message.

15. The apparatus of claim 12, wherein the processor is further configured to:

transmit a ready-to-send (RTS) or multi-user ready-to-send (MU-RTS) message to the ML-AP associated with the multiple link station over the one or more wireless links associated with the multiple link station; and receive a clear-to-send (CTS) or multi-user clear-to-send (MU-CTS) message from the ML-AP associated with the multiple link station over the one or more wireless links associated with the multiple link station to establish a multi-link transmission opportunity (TXOP) across the one or more wireless links.

16. The apparatus of claim 12, wherein a second multiple link station not associated with the one or more wireless links is configured to update a network-allocation vector (NAV) to prevent transmission of data during a multi-link transmission opportunity time period based on receiving any of a RTS/MU-RTS message and a CTS/MU-CTS message.

17. An apparatus for wireless communication, comprising:

a processor that is configured to perform a method, the processor configured to:

transmit, by a multiple link access point (ML-AP), an indication message to a multiple link station, the indication message indicating that the ML-AP is capable of transmitting information over at least one wireless link;

receive a first request message including multi-link capability information and a proposed multi-link configuration including a primary channel and alternate channels of the multiple link station to the ML-AP;

associate one or more wireless links with the multiple link station based on the multi-link capability information;

receive a control request message from the multiple link station over the one or more wireless links, the control request message including information for a configuration of a multi-link transmission and a receiving chain; and transmit a control response message to the multiple link station wherein the multiple link station is configured to establish a multi-link transmission opportunity (TXOP) over the one or more wireless links configured based on the received configuration of the multi-link transmission.

18. The apparatus of claim 17, wherein the processor is further configured to:

transmitting, by the ML-AP, a control message to the multiple link station, wherein the control message identifies a multi-radio configuration that includes the one or more wireless links.

19. The apparatus of claim 17, wherein a configuration of the multiple link station includes setting a state of a first link of the one or more wireless links to an enabled state if the first link was in a disabled state.

20. The apparatus of claim 17, wherein the control request message includes a ready-to-send (RTS) or a multi-user RTS (MU-RTS) message, and wherein the control response message includes clear-to-send (CTS) or multi-user clear-to-send (MU-CTS) message.

* * * * *